(12) United States Patent
Heacock et al.

(10) Patent No.: US 12,306,154 B2
(45) Date of Patent: May 20, 2025

(54) MELTABLE COLOR CHANGEABLE INDICATORS WITH ORGANIC POLYMER CORES AND METHODS OF MAKING SUCH MELTABLE INDICATORS AND COMPOSITES THEREOF

(71) Applicant: Thermographic Measurements Limited, Connah's Quay (GB)

(72) Inventors: Gregory L. Heacock, Maple Valley, WA (US); Andrew Mills, Holywood (GB)

(73) Assignee: THERMOGRAPHIC MEASUREMENTS LIMITED (GB)

(*) Notice: Subject to any disclaimer, the term of this patent is extended or adjusted under 35 U.S.C. 154(b) by 0 days.

(21) Appl. No.: 15/832,379

(22) Filed: Dec. 5, 2017

(65) Prior Publication Data

US 2019/0170714 A1    Jun. 6, 2019

(51) Int. Cl.
*G01N 31/22*     (2006.01)
*B29C 48/04*     (2019.01)
(Continued)

(52) U.S. Cl.
CPC .......... *G01N 31/223* (2013.01); *B29C 48/04* (2019.02); *B32B 27/00* (2013.01); *C08J 3/02* (2013.01); *C08J 3/126* (2013.01); *C08J 3/226* (2013.01); *C08K 5/17* (2013.01); *C08K 9/10* (2013.01); *C08L 23/04* (2013.01); *C08L 23/06* (2013.01); *C08L 23/12* (2013.01); *C08L 25/06* (2013.01); *C08L 33/12* (2013.01); *C08K 5/0041* (2013.01); *C08K 5/42* (2013.01); *C08K 5/46* (2013.01); *C08L 2666/70* (2013.01)

(58) Field of Classification Search
None
See application file for complete search history.

(56) References Cited

U.S. PATENT DOCUMENTS 3,018,611 A    1/1962  Biritz
3,768,976 A    10/1973 Hu
(Continued)

FOREIGN PATENT DOCUMENTS

CN    101479584    7/2009
CN    101501468    8/2009
(Continued)

OTHER PUBLICATIONS

International Search Report, PCT/US 18/63971, mailing date Apr. 12, 2019.
(Continued)

*Primary Examiner* — Ronak C Patel
(74) *Attorney, Agent, or Firm* — Jackson Walker LLP

(57) ABSTRACT

Color changeable indicator particles having a meltable, particulate organic core, and at least one color changeable indicator coated on the particulate organic core. Color changeable indicator particles can be incorporated into composite polymer materials while maintaining the efficacy and stability of the indicator. The indicators provide simple, reliable, and cost effective detection means for detecting ammonia and carbon dioxide, and may find use in applications such as food packaging and medical applications.

8 Claims, 37 Drawing Sheets
(28 of 37 Drawing Sheet(s) Filed in Color)

(51) Int. Cl.

| | | |
|---|---|---|
| *B32B 27/00* | (2006.01) | |
| *C08J 3/02* | (2006.01) | |
| *C08J 3/12* | (2006.01) | |
| *C08J 3/22* | (2006.01) | |
| *C08K 5/17* | (2006.01) | |
| *C08K 9/10* | (2006.01) | |
| *C08L 23/04* | (2006.01) | |
| *C08L 23/06* | (2006.01) | |
| *C08L 23/12* | (2006.01) | |
| *C08L 25/06* | (2006.01) | |
| *C08L 33/12* | (2006.01) | |
| *C08K 5/00* | (2006.01) | |
| *C08K 5/42* | (2006.01) | |
| *C08K 5/46* | (2006.01) | |

(56) References Cited

U.S. PATENT DOCUMENTS

| | | |
|---|---|---|
| 3,899,295 A | 8/1975 | Halpern |
| 3,939,968 A | 2/1976 | Ryder |
| 4,003,709 A | 1/1977 | Eaton |
| 4,098,577 A | 7/1978 | Halpern |
| 4,135,792 A | 1/1979 | Dreg |
| 4,526,752 A | 7/1985 | Perlman |
| 4,692,309 A | 9/1987 | Pannwitz |
| 4,728,499 A | 3/1988 | Fehder |
| 5,159,360 A | 10/1992 | Stoy |
| 5,518,927 A | 5/1996 | Malchesky |
| 5,623,323 A | 4/1997 | Johnson |
| 5,706,073 A | 1/1998 | Volk |
| 5,942,438 A | 8/1999 | Antonoplos |
| 6,060,210 A | 5/2000 | Eda |
| 6,114,509 A | 9/2000 | Olsen |
| 6,132,086 A | 10/2000 | Henwood |
| 6,218,189 B1 | 4/2001 | Antonoplos |
| 6,254,969 B1 | 7/2001 | Eberle |
| 6,270,724 B1 | 8/2001 | Woodaman |
| 6,518,231 B2 | 2/2003 | Appel |
| 6,634,747 B1 | 10/2003 | Atkins |
| 6,634,753 B1 | 10/2003 | Rozenman |
| 6,710,221 B1 | 3/2004 | Pierce |
| 6,790,411 B1 | 9/2004 | Forest |
| 6,851,808 B2 | 2/2005 | Heacock |
| 7,219,799 B2 | 5/2007 | Bonnette |
| 7,244,252 B2 | 7/2007 | Bernt |
| 7,785,299 B2 | 8/2010 | Crawford |
| 8,137,303 B2 | 3/2012 | Crawford |
| 8,163,237 B2 | 4/2012 | Crawford |
| 8,257,663 B2 | 9/2012 | Crawford |
| 8,338,131 B2 | 12/2012 | Callen |
| 8,388,131 B2 | 3/2013 | Heacock |
| 8,663,998 B2 | 3/2014 | Heacock |
| 8,790,930 B2 | 7/2014 | Mills et al. |
| 9,289,528 B2 | 3/2016 | Nair et al. |
| 9,746,421 B2 | 8/2017 | Heacock |
| 2002/0022008 A1 | 2/2002 | Forest |
| 2002/0023642 A1 | 2/2002 | Holmsten |
| 2002/0137123 A1 | 9/2002 | Hui |
| 2003/0199095 A1 | 10/2003 | Yuyama |
| 2004/0115319 A1 | 6/2004 | Morris |
| 2004/0180391 A1 | 9/2004 | Gratzl |
| 2005/0041200 A1 | 2/2005 | Rich |
| 2005/0125924 A1 | 6/2005 | Benjamin |
| 2005/0164898 A1 | 7/2005 | Kalsuri |
| 2006/0046301 A1 | 3/2006 | Happe |
| 2006/0054525 A1 | 3/2006 | Dean |
| 2006/0054526 A1 | 3/2006 | Dean |
| 2006/0069305 A1 | 3/2006 | Couvillon, Jr. |
| 2006/0110835 A1 | 5/2006 | Gohil |
| 2006/0181676 A1 | 8/2006 | Tucker |
| 2006/0236913 A1 | 10/2006 | Wills |
| 2007/0017042 A1 | 1/2007 | Cincotta |
| 2007/0140911 A1 | 6/2007 | Carney |
| 2008/0081020 A1 | 4/2008 | Huang |
| 2008/0129960 A1 | 6/2008 | Heacock |
| 2008/0287568 A1 | 11/2008 | Mathew et al. |
| 2009/0266289 A1 | 10/2009 | Greene |
| 2009/0301382 A1 | 12/2009 | Patel |
| 2009/0303440 A1 | 12/2009 | Heacock |
| 2010/0112680 A1 | 5/2010 | Brockwell |
| 2010/0256524 A1 | 10/2010 | Levinson et al. |
| 2010/0269837 A1 | 10/2010 | Levinson et al. |
| 2011/0124115 A1 | 5/2011 | Piper |
| 2011/0130727 A1 | 6/2011 | Crawford |
| 2011/0130728 A1 | 6/2011 | McKinnon |
| 2011/0259086 A1 | 10/2011 | Harris |
| 2012/0276647 A1 | 11/2012 | Mills |
| 2013/0130399 A1 | 5/2013 | Mills |
| 2013/0150785 A1 | 6/2013 | Heacock |
| 2013/0220907 A1* | 8/2013 | Fulkerson ............ F04B 43/1284 210/186 |
| 2013/0269592 A1 | 10/2013 | Heacock |
| 2013/0293353 A1 | 11/2013 | McPherson |
| 2014/0296402 A1 | 10/2014 | Jung |
| 2015/0004707 A1 | 1/2015 | Nair et al. |
| 2015/0087076 A1 | 3/2015 | Heacock |
| 2015/0225304 A1 | 8/2015 | Donze |
| 2015/0253252 A1 | 9/2015 | Smyth |
| 2015/0346513 A1* | 12/2015 | Heacock ................ G01N 33/52 351/159.3 |
| 2016/0011157 A1* | 1/2016 | Smyth .................... G01N 21/78 422/426 |
| 2016/0327491 A1 | 11/2016 | Wood |
| 2017/0174983 A1* | 6/2017 | Odeh ...................... C08L 69/00 |
| 2018/0104017 A1 | 4/2018 | Heacock |

FOREIGN PATENT DOCUMENTS

| | | |
|---|---|---|
| EP | 0231499 | 8/1987 |
| EP | 2021755 | 5/2007 |
| WO | WO02/099416 A1 | 12/2002 |
| WO | WO2013085655 | 6/2003 |
| WO | WO2004077035 | 9/2004 |
| WO | WO2015048138 | 4/2005 |
| WO | WO2007/018301 | 2/2007 |
| WO | WO2008095960 | 8/2008 |

OTHER PUBLICATIONS

Michael Freemantle, Intelligence Ink Detects Oxygen, Chemical Gas Sensing, Aug. 2, 2004, p. 11, vol. 82, No. 31, Chemical & Engineering News, USA (2 pages).

Swann et al., "Designing Out Curative Syringe Reuse: Maximising Global Acceptance and Impact by Design," Internet Citation, http://eprints.hud.ac.ukl11783/ [dated Sep. 18, 2013].

The Guardian, Architecture and Design Blog with Oliver Wainwright, "How colour-changing technology could revolutionise the medical industry," Internet Citation, http://www.theguardian.cco/artanddesign/architectarc-design-blog/2013/aug28/colour-changing-syringe-medical-design [dated Sep. 18, 2013].

International Search Report, PCT/US 18/63971, mailing date Jun. 18, 2020.

1 Extended European Search Report, European Application No. 1885186.9, dated Jul. 20, 2021.

European Patent Office Communication Pursuant to Article 94(3) EPC, for App. No. 18885186.9-1014, dated Jun. 24, 2022, 7 pages.

* cited by examiner

| Dye | Matrix Material | Base | Photographs of films before (left) and after exposing to CO₂ (right) | Thickness of the film (μm) | %CO₂ (S=1/2) | $t_{50\downarrow}$ (min) | $t_{50\uparrow}$ (min) |
|---|---|---|---|---|---|---|---|
| MCP | LDPE | TBAOH |  | 55 | 0.99 | 0.2 | 3.3 |
| TB | LDPE | TBAOH |  | 60 | 0.26 | 0.2 | 4.1 |
| PR | LDPE | TBAOH |  | 52 | 4.2 | 0.2 | 1.5 |

| All organic CO₂ sensitive plastic films | Base | Photographs of films before (left) and after exposing to CO₂ (right) | Thickness of the film (μm) | %CO₂ (S=1/2) | $t_{50\downarrow}$ (min) | $t_{50\uparrow}$ (min) |
|---|---|---|---|---|---|---|
| 10% MCP-LDPE-LDPE | TBAOH |  | 55 | 0.99 | 0.2 | 3.3 |
| 10% MCP-PS-LDPE | TBAOH |  | 45 | 0.96 | 0.1 | 2.9 |
| 10% MCP-PMMA-LDPE | TBAOH |  | 58 | 1.6 | 0.2 | 8.6 |
| 10% MCP-PP-LDPE | TBAOH |  | 55 | 1.03 | 0.2 | 2.3 |

| Ammonia indicator | Photographs of films before (left) and after exposing to Ammonia (right) | Thickness (μm) | λmax (nm) | | t$_{90}$ (hour) |
|---|---|---|---|---|---|
| | | | D- | HD | |
| 10% BPB-LDPE-LDPE | | 60 | 432 | 620 | 25 |
| 10% BCG-LDPE-LDPE | | 68 | 420 | 619 | 84 |

FIGURE 13

| Ammonia indicator | Photographs of films before (left) and after exposing to Ammonia (right) | Thickness (μm) | λmax (nm) D- | λmax (nm) HD | t₉₀ (hour) |
|---|---|---|---|---|---|
| 10% BPB-PP-LDPE | | 65 | 432 | 616 | 36 |
| 10% BPB-LDPE-LDPE | | 60 | 432 | 620 | 25 |

FIGURE 14

MELTABLE COLOR CHANGEABLE INDICATORS WITH ORGANIC POLYMER CORES AND METHODS OF MAKING SUCH MELTABLE INDICATORS AND COMPOSITES THEREOF

CROSS-REFERENCE TO RELATED APPLICATIONS

[Not Applicable]

FEDERALLY SPONSORED RESEARCH OR DEVELOPMENT

[Not Applicable]

BACKGROUND OF THE APPLICATION

Color changeable indicators are used to detect a number of substances (e.g. carbon dioxide or ammonia) in an environment and are particularly important in, amongst other things, medical applications and food and drug packaging. These color changeable indicators typically rely on reactive dyes or pigments (e.g. pH or redox indicators). These dyes or pigments can exist in at least two different chemical states each having a different color. When the dye or pigment is in the first chemical state it appears a first color. When the dye or pigment is exposed to the substance that it is intended to detect, it undergoes a chemical reaction to form the second chemical state. In the second chemical state the dye or pigment appears a second color. In this manner it indicates the presence of the substance that it is intended to detect.

In one example, gas permeation through the plastic material of a container or packaging negatively affects the freshness or quality of the contents of many packaged products. In the case of pharmaceuticals, oxygen absorption and subsequent reaction, decreases potency. In the case of food products, oxygen absorption into the packaged food promotes the growth of many food spoilage microbes which can cause a loss of product quality, including freshness and safeness to eat. Carbon dioxide is very commonly used in the food and drug packaging. In Modified Atmosphere Packaging (MAP) a package is flood filled with an oxygen-free gas, such as carbon dioxide. The package is then sealed. The carbon dioxide environment prevents spoilage and allows the food or drug to last longer. Monitoring the carbon dioxide levels inside the packaging using a color changeable indicator allows the user to determine the freshness of the food or drug product inside. As yet another example in food and drug packaging, ammonia and other volatile amines can be given off when certain foods, e.g. fish and meat, spoil. These volatile amines can be measured in order to determine freshness of the food product.

In another example, many products currently marketed and sold to consumers are designed for limited use. These products are usually associated with a single event or limited period of time for which it can be used. There are many reasons for the need of single use or limited use products. One example is medical and ophthalmic devices, such as scalpels, catheters, and tonometers. Instrument contamination and cross infection between patients is an ever present concern if such products are inadvertently reused. Decontamination procedures or employment of single-use devices are methods used to control cross infection, but they rely on personnel awareness, willingness to follow protocol, monitoring and documentation. Color changeable indictors can be used to indicate that these items are no longer safe for use.

In yet another example, many products have a shelf life after which they should not be used because of a risk of infection or a decrease in effectiveness, e.g. cosmetic and personal hygiene products. For example, it has been found that cosmetic applicators can harbor bacteria that can infect the eye and should be disposed of prior to their expiration to prevent eye infections. Another example of a limited use product is a catheter, which in many cases should be removed from a patient after a particular period of time to avoid infection. In these instances a color changeable indicator can be useful to show that a product should no longer be used. Various color change indicators and related apparatuses, as well as disposable, limited, and restricted use apparatuses for use with such indicators, have been described in applications and patents co-owned by applicant. These color change indicators may be used to assess the condition of a disposable, limited use, or restricted use apparatus.

Various color change indicators and related apparatuses, as well as disposable, limited, and restricted use apparatuses, have been described in applications and patents co-owned by applicant. These color change indicators may be used to assess the condition of a disposable, limited use, or restricted use apparatus. These patents, applications and their related cases are incorporated herein by reference. U.S. Pat. No. 8,388,131, describes, for example, a disposable limited or restricted use apparatus that includes a color changeable portion wherein the time that the color change occurs is controlled so that it coincides to the approximate time of the end of one use of a single use apparatus or to the approximate expiration time for extended but limited or restricted use apparatus. U.S. patent application Ser. No. 14/292,246, for example, describes carbon dioxide sensing color change indicators for use with disposable, limited use, or restricted use apparatuses. U.S. Pat. No. 9,746,421 describes, for example, use protocol indicators having a color changeable dye that changes color after exposure to a particular environment for a defined time and an exposure time indicator that uses a color changeable dye or multiple color changeable dyes that change color after exposure to an environment in a sequential manner.

In many applications, color changeable indicators can be disposed on the product packaging or on the product itself, for example, by use of a sticker that can be applied to the packaging or product. Examples of such applications are described in U.S. Pat. No. 9,746,421, which is hereby incorporated by reference. However, in some applications it is desirable to incorporate a color changeable indicator into a film or other composite material, such as a polymer material, instead of, e.g., merely being applied to the surface of a particular product or item. This allows for manufacturing options that are not present with a dye applied onto a substrate. For example, a color changeable indicator that could be incorporated into a film or plastic article of manufacture such that the indicator is more substantively integrated into the product or article would be desired. Thus color changeable indicators that are capable of being incorporated within films or composites without substantial alteration to the chemical nature of the indicator and that can be prepared and processed via standard polymer processing techniques while maintaining the efficacy and stability of the new indicators are desirable.

U.S. Pat. No. 8,790,930, and its related case, which are incorporated herein in its entirety by reference, describe chemical indicators having a particulate inorganic substrate, and at least one reactive dye or ink coated on and/or impregnated within the particulate inorganic substrate and composites (e.g. films) made with such chemical indicators. Examples of inorganic substrates are hydrophilic silica or alumina. The inorganic substrates may be, for example, particles whose sizes are about 1-100 nm, i.e. nanoparticles (NP). Composites utilizing the chemical indicators may be made, for example, by extrusion with a thermoplastic polymer. The inorganic substrates are stated to improve the storage stability and/or thermal stability of the reactive dye or ink.

However, the applicants have recognized a number of concerns with the use of these inorganic substrates. For example, the inorganic substrate which is in the form of a fine powder, usually nanoparticles, is known to present a health risk. For example, the long-term lung disease, silicosis, is due to inhalation of silica dust particles. Thus, the making and handling of fine metal oxide-based coated with such chemical indicators represents a health risk, as does the eventual disposal of the plastic composites which incorporates the coated particles. Indeed, incineration of such films will produce high levels of metal oxide dust. Additionally, plastic films that incorporate inorganic substrates are not biodegradable (since the inorganic substrate is not biodegradable) and thus present an environmental and health hazard. Moreover, plastic films that incorporate inorganic substrates are not substantially homogeneous due to the particulate nature of the substrate, which persists in the composite as described further below. The above issues represent barriers to routine use of this technology in a wide number of applications, including, for example, medical devices and packaging. Nonetheless, fabricating suitable alternative indicators has been difficult due to the sensitivity of color changeable indicators and the chemistry surrounding them; thus, maintaining efficacy in composites has been a challenge.

SUMMARY OF THE INVENTION

Color changeable indicator particles having a particulate organic core with a low melting point, and at least one color changeable indicator coated on the organic core, can be incorporated into thermoplastic polymer materials while maintaining the efficacy and stability of the indicator. Polymeric composites with indicator substantially homogenously dispersed within the composite can be fabricated utilizing meltable, organic color changeable indicator particles. The indicators provide simple, reliable, and cost effective detection means for detecting ammonia or carbon dioxide, enhance the safety, environmental friendliness, and visual effectiveness of the indicator and may find use in applications such as food packaging and medical applications.

In one embodiment, the present method of producing color changeable indicator particles comprises (1) providing at least one particulate organic polymer having a melting between about 25° C. and about 200° C.; (2) combining the polymer with at least one color changeable indicator; (3) adding a solvent and forming a dissolved solution; and (4) evaporating the solvent to produce a dry powder comprising particles with an organic polymer core. The present technology also encompasses the color changeable indicator particles produced by this method.

The method can further comprise extruding the color changeable indicator particles to form an intermediate composite and cutting the intermediate composite to form masterbatch pellets. The masterbatch pellets can then be combined with pellets of a second organic polymer having a melting point between about 25° C. and about 200° C. to form a combined mixture of pellets. The mixture of pellets can then be extruded.

In one embodiment, the present method of producing a color changeable polymeric composite comprises (1) coating organic polymer particles having a melting point between about 25° C. and about 200° C. with at least one color changeable indicator to form color changeable indicator particles; (2) combining the color changeable indicator particles with a second organic polymer having a melting point between about 25° C. and about 200° C. to form a combined powder; and (3) extruding the combined powder. The present technology also encompasses the color changeable polymeric composite produced by this method.

The method can further comprise breaking up the first composite formed in steps (1)-(3) above to form pellets; and extruding the pellets to form the color changeable polymeric composite.

In one embodiment, the present color changeable indicator particle comprises a particulate organic core comprising a core polymer having a melting point below about 200° C.; and at least one color changeable indicator coated on the polymer. The color changeable indicator particles can be present in a mixture with other color changeable indicator particles and other components, e.g. a second polymer. The color changeable indicator may be a carbon dioxide-based indicator or an ammonia-based indicator.

In one embodiment, the present color changeable polymeric composite comprises at least one organic polymer; and at least one color changeable indicator substantially homogeneously dispersed within the polymer wherein the polymeric composite has a melting point between about 25° C. and about 200° C. Such a color changeable polymeric composite may substantially lack particulates or be substantially free of particle aggregation. The color changeable indicator may be a carbon dioxide-based indicator or an ammonia-based indicator. The composite is in the form of a film, sheet or tube. The composite may be disposed on or incorporated into a ring.

In one embodiment, the present apparatus comprises a disposable, limited, or restricted use device; and a color changeable polymeric composite comprising at least one organic polymer and at least one color changeable indicator substantially homogeneously dispersed within the polymer wherein the polymeric composite has a melting point between about 25° C. and about 200° C. As one example, the apparatus may be a medical device.

These and other advantages and novel features of the present invention, as well as details of illustrated embodiments thereof will be more fully understood from the following description and from the figures.

BRIEF DESCRIPTION OF SEVERAL VIEWS OF THE DRAWINGS

The patent or application file contains at least one drawing executed in color. It is understood that copies of this patent or patent application publication with color drawing(s) will be provided by the Office upon request and payment of the necessary fee.

FIG. 13 shows characteristics of ammonia-sensitive films with different color changeable indicators.

FIG. 14 shows characteristics of ammonia-sensitive films.

Figure 1:
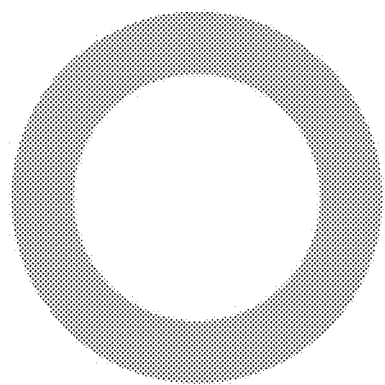
FIG. 1 shows a schematic illustration of a color changeable indicator particle according to an embodiment of the present invention with a color changeable indicator (2) disposed on a polymer core (1) before and after exposure to the relevant substance (A), e.g. $CO_2$.
Figure 1:
Figure 1:
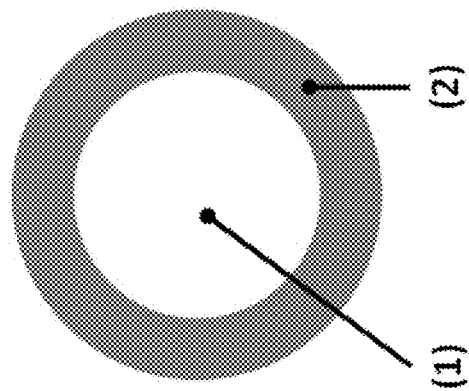

The foregoing summary, as well as the following detailed description of certain embodiments of the present application, will be better understood when read in conjunction with the appended drawings. For the purposes of illustration, certain embodiments are shown in the drawings and described herein. It should be understood, however, that the claims are not limited to the arrangements and instrumentality shown in the attached drawings or the detailed description. Furthermore, the appearance shown in the drawings is one of many ornamental appearances that can be employed to achieve the stated functions of the system.

DETAILED DESCRIPTION

The present technology relates to color changeable indicator particles, color changeable polymeric composites formed from those color changeable indicator particles, and methods of making and using color changeable indicator particles and/or color changeable polymeric composites.

In one embodiment, a color changeable indicator particle comprises an organic polymer particle (discussed herein, for example, as an organic core polymer or organic polymer core) having a melting point below about 200° C. and at least one color changeable indicator coated on the polymer particle. A schematic illustration of a color changeable indicator particle is shown in FIG. 1. The color changeable indicator particle is made up of an organic polymer core (1). The organic polymer core is coated with at least one color changeable indicator (2). Multiple color changeable indicator particles of the present technology can be present in a mixture with each other and other components.

An organic polymer particle that may serve as the core polymer is an organic polymer that is in the form of distinct or separate particles such that at least one color changeable indicator (2) can be coated onto the organic polymer particles (1) to form color changeable indicator particles of the present technology as shown in FIG. 1. The particulate organic core polymer can be, for example, low density polyethylene (LDPE), linear low density polyethylene (LLDPE), high density polyethylene (HDPE), isotactic polymethyl methacrylate (IPMMA), polymethyl methacrylate (PMMA), polystyrene (PS), polypropylene (PP), polyvinylidene fluoride (PVDF), polyoxymethylene (POMH), polybutene-1 (PB), nylon 11 (PA 11), nylon 12 (PA 12), ethylene-vinyl acetate (EVA), polycaprolactone (PCL), polyethylene oxide (PEOX), polypropylene oxide (PPDX) or mixtures thereof. Exemplary polymers and their melting points are listed in Table 1. As discussed further below, it is understood that the melting temperatures of a given organic polymer may vary depending on the composition of the specific polymer used or selected. For example, polyethylene may have a melting point in the range of about 105° C. to 180° C. with low density polyethylene in the range, for example, of about 105 to 120° C. and high density polyethylene, for example, in the range of about 120 to 180° C. Likewise, polypropylene may have a melting point, for example, in the range of about 160 to 170° C.

TABLE 1

Potential Particulate Organic Core Polymers and Bulk Polymers And Melting Temperatures

| Polymer | Abbreviation | Melting temp ° C. |
|---|---|---|
| Polystyrene | PS | 240 |
| Low density polyethylene | LDPE | 120 |
| Linear low density polyethylene | LLDPE | 127 |
| High density polyethylene | HDPE | 130 |
| Isotactic polymethyl methacrylate | IPMMA | 160 |
| Polymethyl methacrylate | PMMA | 160 |
| Polypropylene | PP | 165 |
| Polyvinylidene fluoride | PVDF | 177 |
| Polyoxymethylene | POMH | 175 |
| Polybutene-1 | PB | 126 |
| Nylon 11 | PA 11 | 185 |
| Nylon 12 | PA 12 | 175 |
| Ethylene-vinyl acetate | EVA | 72-98 |
| Polycaprolactone | PCL | 60 |
| Polyethylene oxide | PEOX | 66 |
| Polypropylene oxide | PPOX | 75 |

As discussed above, the particulate organic polymer used as the core polymer comprises a particle and may be available in the form of a powder comprised of particles. It is understood to a person of ordinary skill in the art that a particle has characteristics such as, for example, reduced size and typically spherical shape. The particle size of the organic core polymer particles of embodiments of the present invention can be relatively large, for example, having an average particle size of greater than about 1 micron, and preferably having an average particle size between about 10 and 1000 microns. It is known to a person of ordinary skill in the art how to prepare polymer powders with particles of appropriate size, for example, through known grinding or milling techniques. For example, the organic core polymer particles may generally have a particle size of greater than (>) about 10 microns in diameter, alternatively greater than (>) about 20 microns, alternatively greater than (>) about 50 microns, alternatively greater than (>) about 80 microns, alternatively greater than (>) about 110 microns, alternatively greater than (>) about 140 microns, alternatively greater than (>) about 170 microns, alternatively greater than (>) about 200 microns, alternatively greater than (>) about 230 microns, alternatively greater than (>) about 260 microns, alternatively greater than (>) about 290 microns, alternatively greater than (>) about 320 microns, alternatively greater than (>) about 350 microns, alternatively greater than (>) about 380 microns, alternatively greater than (>) about 410 microns, alternatively greater than (>) about 440 microns, alternatively greater than (>) about 470 microns and alternatively greater than (>) about 500 microns. In one preferred embodiment, the core polymer is LDPE with a particle size of about 250 microns. In such examples they are particulate, but not nanoparticulate and they do not need to be finely divided. This is in contrast to prior art technology that relies on inorganic nanoparticle substrates, for example, having a size of 7 nm. Using organic polymer particles of larger size makes the manufacture of the color changeable indicator particles easier and poses fewer risks to health or the environment than the inorganic nanoparticles.

The particulate organic polymer used as the core polymer is meltable at generally low temperatures and has a melting point such that the core polymer is capable of being melted and/or extruded, for example, using known melting or extrusion techniques. The particulate organic polymer is preferably a solid at room temperature (approximately 20-22° C.) and, as discussed above, may take the form of a powder. In some embodiments, the particulate organic core polymer can have a melting point above room temperature and below about 200° C., alternatively above room temperature and below about 150° C., alternatively above room temperature and below about 100° C., alternatively above room temperature and below about 85° C. As discussed above, the melting temperatures of a given organic polymer used as the core polymer may vary depending on the composition of the specific polymer used or selected. For example, the core polymer may have a melting point in the range of about 105-180° C., about 105-120° C., about 120-180° C., or about 160-170° C. In certain embodiments, the melting point is between about 25° C. and about 200° C., alternatively about 60 to 120° C. or about 120 to 185° C., alternatively about 60-75° C. Selection of an organic core polymer with an appropriate melting point allows the color changeable indicator particle to form color changeable composites with certain desirable properties and will be discussed in more detail below.

At least one color changeable indicator (2) is coated onto the particulate organic polymer (1) to form the color changeable indicator particles of the present technology as shown in FIG. 1, which comprise an organic polymer core. The at least one color changeable indicator detects the presence of a chemical substance shown as A in FIG. 1. As is shown in FIG. 1, the color changeable indicator (2) changes color when in the presence of the chemical substance A. Various pigments or dyes can be used as the present color changeable indicators in order to sense the different chemical substances. Such substances include, but are not limited to gases, such as carbon dioxide and ammonia. Detection may be performed using UV/Visible spectrophotometry, fluorimetry, or digital photography, coupled with color analysis.

Examples of carbon dioxide-sensitive reactive (e.g. pH sensitive) dyes include, but are not limited to m-Cresol Purple (MCP, Hydroxy triarylmethane), Thymolphthalein (3,3-bis(4-hydroxy-2-methyl-5-propan-2-ylphenyl)-2-benzofuran-1-one), o-Cresolphthalein, Acryloly florescein (AcFl), β-methyl umbelliferon (BMUB), Bromothymol (BTB, Hydroxy triarylmethane), 5' and 6'-Carboxyseminaphtholfluorescein (c-SNAFL), 5' and 6'-Carboxyseminaphtholrhodamine (c-SNARF), Cresol Red (CR, o-Cresolsulfonephthalein), Hexadecyl trimethyl ammonium cation ($CTA^+$), Hexadecyl trimethyl ammonium hydroxide (CTAH), Dual lumophore referencing (DLR), 2-(2,4-Dinitrophenylaxo)-1-naphthol-3,6disulphonic acid (DNPA), tris (thenoyltrifluoroacetonato) europium (III) ($[Eu(tta)_3]$), Fluorescein (Fl, resorcinolphthalein), 7-hydroxycoumarin-4-acetic acid (HCA), 1, Hydroxypyrene-3,6,8-trisulphonic acid (HPTS), Neutral red (NR, toluylene red), Phenol Red (PR, phenolsulfonphthalein), Rhodamine 6G (R6G), Sulforhodamine 101 (SRh), Thymol blue (TB, thymolsulphonephthalein), and/or Texas Red hydrazine (THR). Any other pH-sensitive dye or ink may be suitable for use as a $CO_2$-sensitive reactive dye.

Examples of fluorimetric dyes include but are not limited to 1-hydroxypyrene-3,6,8-trisulphonate, 1,3-dihydroxypyrene-6,8-disulphonate, fluorescein, umbelliferone, 4-methylumbelliferone, 3-benzothiazoylbelliferone, 7-hydroxycoumarin-3-carboxylic acid, 1-naphthol-2-sulphonate, 1-naphthol-4-sulphonate, 2-naphthol-6-sulphonate, 7-hydroxyflavone, 7-hydroxyisoflavone, 3-hydroxyxanthone, 3,6-dihydroxyxanthone, 7-hydroxy-4-methylchromon, 7-hydroxylepidone, 3-hydroxyxacridone, harmol methoiodide, salicylaldehyde semicarbazone and 2-hydroxycinnamic acid.

In the case of carbon dioxide sensing, phase transfer agents or bases may be needed to extract the anionic form of the colorimetric pH indicator from the highly polar proton rich medium into the less polar environment of the polymer. The water associated with the dye is delivered to the hydrophobic polymer via the phase transfer agent or base. Phase transfer agents or bases that can be used include quaternary cations such as benzyltrimethyl ammonium, trioctylmethyl ammonium, tricaprylmethyl ammonium, tetraoctyl ammonium, tetrabutyl ammonium, cetyltrimethyl ammonium, tetrahexyl ammonium, tetraphenyl phosphonium, trioctyl phosphonium and hexadecyl tributyl phosphonium. In making the $CO_2$-sensing layer, the hydroxide salt of these cations are preferred, for example, tetraoctyl ammonium hydroxide, TOAOH, or tetra butyl ammonium hydroxide, TBAOH. Examples of phase transfer agents and their abbreviations are shown in Table 2.

TABLE 2

Exemplary Phase Transfer Agents Or Bases (Quaternary Cations)

| Phase transfer agents | Abbreviation |
| --- | --- |
| Tetraoctyl ammonium | TOA |
| Tetrabutyl ammonium | TBA |
| Cetyltrimethyl ammonium | CTMA |
| Benzyltrimethyl ammonium | BTMA |
| Trioctylmethyl ammonium | TOMA |
| Tricaprylmethyl ammonium | TCMA |
| Tetrahexyl ammonium | THA |
| Tetraphenyl phosphonium | TPP |
| Trioctyl phosphonium | TOP |
| Hexadecyl tributyl phosphonium | HDTBP |

Examples of dyes useful for making ammonia/amine optical sensors include, but are not limited to Phloxine B, Methyl yellow, Bromophenol blue, Congo red, Methyl Orange, Bromochlorophenol blue, Ethyl orange, Fluorescein, Bromocresol green, Chrysoidin, Methyl red, Alizarin red, Cochineal, Chlorophenol red, Bromocresol purple, 4-Nitrophenol, Alizarin, Nitrazine yellow, Bromothymol blue, Brilliant yellow, Neutral red, Rosolic acid, Phenol red, m-Cresol purple, Thymol blue, Xylenol blue and Cresol red.

Various color change indicators have been described in applications and patents co-owned by applicant. These patents, applications and their related cases are incorporated herein by reference: U.S. Pat. No. 8,388,131, U.S. patent application Ser. No. 14/292,246, U.S. Pat. No. 9,746,421.

In one aspect, color changeable indicator particles, including mixtures thereof, are produced by providing at least one particulate organic polymer (a polymer particle or particles), combining the polymer particles with at least one color changeable indicator, adding a solvent to form a dissolved solution, and evaporating the solvent to produce a dry powder. The resulting dry powder comprises color changeable indicator particles with a particulate organic polymer core coated with at least one color changeable indicator according to an embodiment of the present technology. The organic polymer used to produce the organic core of the color changeable indicator particles may be referred to as the particulate organic core polymer or the organic core polymer.

As discussed above, the color changeable indicator particles of the present invention comprise a particulate organic polymer and at least one color changeable indicator coated on the polymer particles. The particle size of the color changeable indicator particles can be relatively large, for example, having an average particle size of greater than 1 micron, and preferably between about 10 and 1000 microns. For example, the color changeable indicator particles may have a particle size of greater than (>) about 10 microns in diameter, alternatively greater than (>) about 20 microns, alternatively greater than (>) about 50 microns, alternatively greater than (>) about 80 microns, alternatively greater than (>) about 110 microns, alternatively greater than (>) about 140 microns, alternatively greater than (>) about 170 microns, alternatively greater than (>) about 200 microns, alternatively greater than (>) about 230 microns, alternatively greater than (>) about 260 microns, alternatively greater than (>) about 290 microns, alternatively greater than (>) about 320 microns, alternatively greater than (>) about 350 microns, alternatively greater than (>) about 380 microns, alternatively greater than (>) about 410 microns, alternatively greater than (>) about 440 microns, alternatively greater than (>) about 470 microns and alternatively greater than (>) about 500 microns.

The color changeable indicator particles are meltable at generally low temperatures and have a melting point such that they are capable of being melted and/or extruded, for example, using known melting or extrusion techniques. They are preferably solid at room temperature and may have the same melting point temperatures and temperature ranges as described above for the core polymer.

Figure 3:
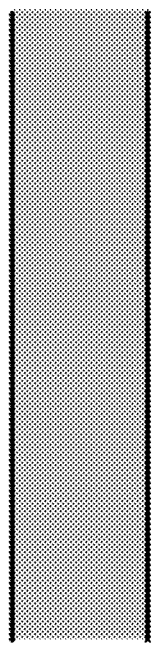
FIG. 3 shows a schematic illustration of a plastic film according to an embodiment of the present invention where the color changeable indicator is substantially homogeneously dispersed within the polymer. Such a film is created by extruding the present color changeable indicator particles having an organic polymer core with a bulk polymer.
Figure 3:
Figure 3:
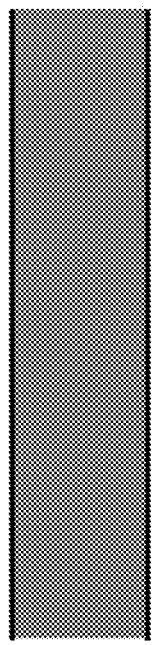

The color changeable indicator particles discussed above can have numerous uses. In one embodiment, the color changeable indicator particles discussed above can be used to make a color changeable polymeric composite, such as a film, tube, sheet, ring, etc. In one embodiment, a color changeable polymeric composite includes at least one organic polymer; at least one color changeable indicator substantially homogeneously dispersed within the polymer wherein the polymeric composite has a melting point between about 60° C. and about 200° C., alternatively between about 85° C. and about 185° C., alternatively between about 60° C. and about 70° C., alternatively between about 70° C. and about 80° C., alternatively between about 80° C. and about 90° C., alternatively between about 90° C. and about 100° C., alternatively between about 100° C. and about 110° C., alternatively between about 110° C. and about 120° C., alternatively between about 120° C. and about 130° C., alternatively between about 130° C. and about 140° C., alternatively between about 140° C. and about 150° C., alternatively between about 150° C. and about 160° C., alternatively between about 160° C. and about 170° C., alternatively between about 170° C. and about 180° C., alternatively between about 180° C. and about 190° C., and alternatively between about 190° C. and about 200° C. The polymeric composite may also have the same melting point temperatures and temperature ranges as described above for the core polymer and color changeable indicator particles. Such a color changeable polymeric composite with at least one color changeable indicator substantially homogenously dispersed within at least one organic polymer according to the present invention is shown in FIG. 3.

Figure 2:
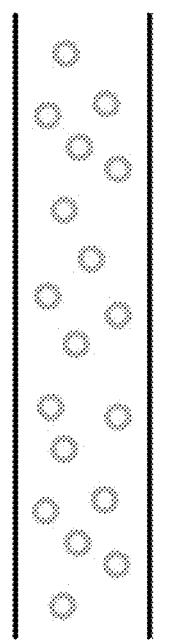
FIG. 2 shows a schematic illustration of a plastic film comprising color changeable indicator particles having cores, e.g. inorganic cores, impregnated in a thermoplastic polymer film.
Figure 2:
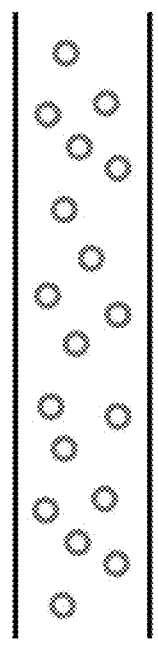

In order to produce such a color changeable polymeric composite, color changeable indicator particles such as those discussed above are combined with a second polymer (referred to as the bulk polymer herein) and extruded and/or melted as described, for example, herein. The second polymer (bulk polymer) and the polymer core from the color changeable indicator particles combine together during extrusion and/or melting to form the at least one organic polymer of the color changeable polymeric composite. The at least one color changeable indicator from the color changeable indicator particles becomes substantially homogenously dispersed within the at least one organic polymer as is shown for example in FIG. 3, one of the advantages of an embodiment of this invention. As can be seen, for example, in FIG. 3, due to the advantages of an embodiment of the present invention, the color changeable polymeric composite substantially lacks particulates and/or particulate aggregation, particularly of the at least one color changeable indicator. This is in contrast to the previously known composites where the inorganic-based particles are impregnated in the composite and the indicator is not able to disperse throughout the composite. As illustrated in FIG. 2, for example, if an inorganic core material is used, the color changeable indicator is not substantially homogenously dispersed within the composite. Rather, the color changeable indicator remains coated around the inorganic cores, which are impregnated in the composite. As discussed herein, in one embodiment of the present invention, it is preferred that the composite comprised of organic polymer allows for color changeable indicator to be dispersed through the composite rather than impregnated in particle form.

The second or bulk polymer may be the same or different from the polymer used as the core polymer in the color changeable indicator particles. Both bulk and core polymers are meltable at generally low temperatures and have a melting point such that they are capable of being extruded and/or melted, for example, using known extrusion and/or melting techniques. Both the bulk and core polymers are preferably a solid at room temperature. The bulk and core polymer can have the same melting points or different melting points. The second or bulk polymer may have the same melting point temperatures and temperature ranges as described above for the core polymer. The second or bulk polymer may have the same melting points and melting point ranges as the core polymer as discussed above.

As described above, the bulk and core polymers can be, for example, low density polyethylene (LDPE), linear low density polyethylene (LLDPE), high density polyethylene (HDPE), isotactic polymethyl methacrylate (IPMMA), polymethyl methacrylate (PMMA), polystyrene (PS), polypropylene (PP), polyvinylidene fluoride (PVDF), polyoxymethylene (POMH), polybutene-1 (PB), nylon 11 (PA 11), nylon 12 (PA 12), ethylene-vinyl acetate (EVA), polycaprolactone (PCL), polyethylene oxide (PEOX), polypropylene oxide (PPDX) or mixtures thereof. Exemplary polymers and their melting points are listed in Table 1.

Figure 9:
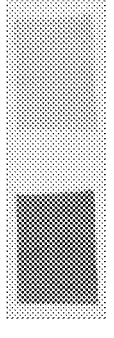
FIG. 9 shows characteristics of $CO_2$-sensitive films.
Figure 9:
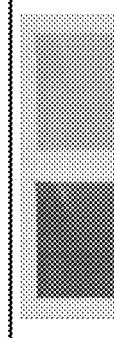
Figure 9:
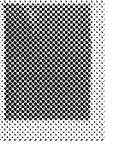
Figure 9:
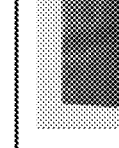

Organic color changeable composites, e.g. films, can be made in which the color changeable indictor particles do not melt at the extrusion temperature used. For examples, this would occur where the melting point of the bulk polymer is less than that of the core polymer. These instances produce composites where the color changeable indicator particles with organic polymer cores are embedded or impregnated in, i.e. encapsulated, and uniformly distributed throughout the bulk polymer, (e.g., a MCP/PS/LDPE film such as those shown in FIG. 9). However, the preferred form is an organic polymer composite in which the color changeable indicator particles melt at the extrusion temperature used. For example, this occurs where the melting point of the bulk polymer is equal to or more than that of the color changeable indicator particles (e.g., MCP/LDPE/LDPE film such as those shown in FIG. 9). This is more desirable because it produces more uniform films, of the type illustrated in FIG. 3.

The inventors found, surprisingly, that the color changing technology in the color changeable indicator particles according to embodiments of the present invention continues to work after the core polymer is extruded and/or melted with the bulk polymer to form the polymeric composite and when the selected polymers are, e.g., solids with low temperature melting points. That is, the heating and melting (and further extruding) process does not affect the ability of the color changeable material (e.g., pigment or dye) to function as an indicator. It was also surprisingly found that, in accordance with meltable embodiments of the present invention, the color changeable indicator will distribute itself substantially homogeneously throughout the composite and not form particulates and/or particulate aggregation, e.g. migrate to the surface of the film. It is noted that substantial homogeneity does not require complete homogeneity but simply reflects that the embodiment allows for dispersion of the indicator within the polymer, much like sugar may be dissolved in a water solution (as compared to a mixture which does not allow for dispersion).

As discussed above, the use of larger organic polymer particles for the particulate organic core polymer offers health and environmental benefits over the small and/or nanoparticulate inorganic substrates in the prior technology. The particle size of the organic core polymer particles or powder particles can be relatively large, for example, having an average particle size of greater than 1 micron, and preferably between about 10 and 1000 microns. For example, the particulate organic core polymers may have a particle size of greater than ($>$) about 10 microns in diameter, alternatively greater than ($>$) about 20 microns, alternatively greater than ($>$) about 50 microns, alternatively greater than ($>$) about 80 microns, alternatively greater than ($>$) about 110 microns, alternatively greater than ($>$) about 1400 microns, alternatively greater than ($>$) about 170 microns, alternatively greater than ($>$) about 200 microns, alternatively greater than ($>$) about 230 microns, alternatively greater than ($>$) about 260 microns, alternatively greater than ($>$) about 290 microns, alternatively greater than ($>$) about 320 microns, alternatively greater than ($>$) about 350 microns, alternatively greater than ($>$) about 380 microns, alternatively greater than ($>$) about 410 microns, alternatively greater than ($>$) about 440 microns, alternatively greater than ($>$) about 470 microns and alternatively greater than ($>$) about 500 microns The organic cores also provide an added benefit when used to produce the color changeable organic polymeric composites of the present invention. Specifically, the color changeable organic polymeric composites are disposable and can be made biodegradable, through the appropriate choice of core polymer and bulk polymer. This is in part because they are not comprised of small inorganic substrates that are not disposable and/or biodegradable and that remain in the composite material made with the inorganic particles. In one disposable/biodegradable example, polycarolactone is used. Polycarolactone is a biodegradable polymer which can be used in $CO_2$ and ammonia indicators using the methods described below.

The present color changeable polymeric composites can be used with disposable, limited, or restricted use devices for indications about use. The present color changeable polymeric composites can also be used with food and drug packaging for indications about freshness. In one embodiment, an apparatus comprises a disposable, limited, or restricted us device and a color changeable polymeric composite comprising at least one organic polymer and at least one color changeable indicator substantially homogeneously dispersed within the polymer.

According to embodiments of the present application, a disposable, limited, or restricted use device could be a medical device having a portion that comes in contact with, e.g., bodily fluids or tissue so as to be susceptible to the transmission of contaminates or disease to a patient and a color changeable polymeric composites disposed on or in the device is useful to indicate that the device should no longer be used due to contamination, expiration or some other manner of being compromised.

The medical apparatus could be, e.g., a disposable catheter, a disposable scalpel, a disposable syringe and/or a disposable ophthalmic lens through which a clinician looks to view a patients' eye.

According to another embodiment of the present application, an apparatus with color changeable polymeric composites comprises a limited use apparatus that has a portion that comes in contact with bodily fluids or tissue and can potentially cause harm to a person if used beyond a limited time or reused and color changeable polymeric composites disposed on or in the apparatus can indicate to the user that the apparatus is no longer to be used.

The apparatus could be a cosmetic applicator, an oral medication or food packaging having an expiration date after which those items should not be used.

In one embodiment of the present invention, the color changeable composite is in the form of a ring or other component that is incorporated into an apparatus such as a medical device. The color changeable composite can be a plastic colored, interchangeable ring indicative of the exposure to the chemical substance being detected, e.g. $CO_2$ or ammonia. The apparatus, e.g. medical device, can be provided with the color changeable composite, e.g. ring, already incorporated into the medical device (e.g., by the manufacturer). Alternatively, multiple interchangeable colored attachable components can be provided in the packaging with the medical device for insertion, connection or attachment by the user.

In one embodiment the present technology comprises, a method of producing color changeable indicator particles comprising the following steps (1) providing at least one particulate organic core polymer or organic polymer particles having a melting below about 200° C., e.g., between about 25° C. and 200° C., (2) combining the organic polymer particles with at least one color changeable indicator, (3) adding a solvent to form a dissolved solution, and (4) evaporating the solvent to produce a dry powder.

The particulate organic core polymer and color changeable indicators can be any of those discussed above. The solvent can be ethanol (EtOH). Other possible solvents include: water, acetone, acetonitrile, benzene, butanol, carbon tetrachloride, chlorobenzene, chloroform, cyclohexane, dichloroethane, diethylene glycol, diethyl ether, diglyme, dimethoxyethane, dimethyl formamide, dimethylsulfoxide, 1,4 dioxane, ethlyl acetate, ethylene glycol, glycerin, heptane, hexane, methanol, methylbutyl ether, methylene chloride, nitromethane, pentane, petroleum ether, propanol, pyridine, tetrahydrofuran, toluene, triethyl amine and xylene. Combining and dissolution can be achieved through typical methods known by those skilled in the art, e.g. stirring, heating, etc. Evaporation can also be achieved through typical methods known in the art including spray drying, air drying, heat drying, freeze drying, etc. In some embodiments a base or phase transfer agent is also added into the solution formed it step 3. Examples of bases and/or phase transfer agents are discussed above.

In one embodiment the present technology comprises a method of producing a color changeable polymeric composite comprising the following steps (1) coating organic polymer particles having a melting point below about 200° C., e.g., between about 25° C. and 200° C., with at least one color changeable indicator to form color changeable indicator particles with an organic polymer core, (2) combining the color changeable indicator particles with a second organic polymer, such as a particulate organic bulk polymer, having a melting point below about 200° C., e.g., between about 25° C. and 200° C., to form a combined powder, and (3) extruding the combined powder.

Step 1 involves the production of the color changeable indicator particles in the manner discussed above. In one embodiment, an organic polymer is ground or milled to a particular particle size to form the particulate organic core polymer used to form the color changeable particles. The mixture of color changeable indicator particles are then combined with second polymer (bulk polymer) in step 2. The bulk polymer can be those discussed above. As discussed above, it can be the same or different from the core polymer in the color changeable indicator particles. Typical methods of combining the color changeable indicator particles and bulk polymer can be used, e.g. stirring, mixing, etc. In step 3 the combined powder is then extruded using standard extrusion techniques. For examples, the combined powder (color changeable indicator particles and bulk polymer) are fed into the barrel of an extruder, via its hopper. The material is gradually melted by the mechanical energy generated by turning screws and by heaters arranged along the barrel. The molten polymer is then forced into a die, which shapes the polymer into a shape that hardens during cooling. Typically this die will be a hole, so as to extrude a string or cord of the polymer material. Alternatively, the die is in the form of a slit, so that the extruded film is in the form of a sheet. The sheet or other extruded composite can be incorporated into or on a restricted, disposable, or limited use item or onto its packaging, for example.

In one embodiment, the combined powder is extruded in step 3 to form a composite, which may be referred to as a first composite, intermediate composite or masterbatch composite. This composite is typically in the form of a cord or string. The diameter of the cord (determined by the size of the extrusion hole) is typically 0.1-10 mm, alternatively 0.1-0.5 mm, alternatively 0.5-1 mm, alternatively 1.0-1.5 mm, alternatively 1.5-2 mm, alternatively 1.5-2.0 mm, alternatively 2.0-2.5 mm, alternatively 2.5-3.0 mm, alternatively 3.0-3.5 mm, alternatively 3.5-4.0 mm, alternatively 4.0-4.5 mm, alternatively 4.5-5.0 mm, alternatively 5.0-5.5 mm, alternatively 5.5-6.0 mm, alternatively 6.0-6.5 mm, alternatively 6.5-7.0 mm, alternatively 7.0-7.5 mm, alternatively 7.5-8.0 mm, alternatively 8.0-8.5 mm, alternatively 8.5-9.0 mm, alternatively 9.0-9.5 mm and alternatively 9.5-10.0 mm. The preferred diameter is 2 mm.

That first composite can then be cut/broken up to form pellets, referred to herein as masterbatch pellets. The masterbatch pellets can be 0.1-10 mm long, alternatively 0.1-0.5 mm, alternatively 0.5-1.0 mm, alternatively 1.0 mm to 1.5 mm, alternatively 1.5 to 2.0 mm, alternatively. 2.0 to 2.5 mm, alternatively 2.5 mm to 3.0 mm, alternatively. 3.0 to 3.5 mm, alternatively 3.5 mm to 4.0 mm, alternatively. 4.0 to 4.5 mm, alternatively 4.5 mm to 5.0 mm, alternatively. 5.0 to 5.5 mm, alternatively 5.5 mm to 6.0 mm, alternatively, 6.0 mm to 6.5 mm, alternatively 6.5 to 7.0 mm, alternatively. 7.0 to 7.5 mm, alternatively 7.5 mm to 8.0 mm, alternatively. 8.0 to 8.5 mm, alternatively 8.5 mm to 9.0 mm, alternatively. 9.0 to 9.5 mm and alternatively 9.5 mm to 10.0 mm. The preferred length is 2 mm. The masterbatch pellets can then be re-extruded, with or without additional bulk polymer, to form the final color changeable composite. For example, the first composite may be formed as a cord or string using a die in the form of a hole. It may then be cut up using a knife, scissors or other cutting mechanism to form pellets. The masterbatch pellets are then extruded with pellets of bulk polymer—which may be the same polymer or different than that used to create the color changeable indicator particles—to form the final color changeable composite, for example a film formed with a slit-shaped die.

In another embodiment, the present technology comprises a method of producing a color changeable polymeric composite comprising (1) coating organic polymer particles having a melting point below about 200° C. with at least one color changeable indicator to form color changeable indicator particles with an organic polymer core, (2) extruding the color changeable indicator particles to form a first or intermediate composite, (3) breaking up the first or intermediate composite to form masterbatch pellets, (4) combining the masterbatch pellets with pellets of a second organic polymer, referred to here as the bulk polymer, having a melting point below about 200° C. to form a combined mixture of pellets, and (5) extruding the combined mixture of pellets.

As discussed above, step 1 involves the production of the color changeable indicator particles. In step 2, the color changeable indicator particles are extruded using standard extrusion techniques to form the first or intermediate composite, i.e. the masterbatch composite. For examples, the color changeable indicator particles are fed into the barrel of an extruder, via its hopper. The material is gradually melted and forced through a die as discussed above. They die is typically a hole, so as to extrude a string or cord, of the intermediate composite or masterbatch composite. The diameter of the cord (determined by the size of the extrusion hole) is typically 0.1-10 mm, alternatively 0.1-0.5 mm, alternatively 0.5-1 mm, alternatively 1.0-1.5 mm, alternatively 1.5-2 mm, alternatively 1.5-2.0 mm, alternatively 2.0-2.5 mm, alternatively 2.5-3.0 mm, alternatively 3.0-3.5 mm, alternatively 3.5-4.0 mm, alternatively 4.0-4.5 mm, alternatively 4.5-5.0 mm, alternatively 5.0-5.5 mm, alternatively 5.5-6.0 mm, alternatively 6.0-6.5 mm, alternatively 6.5-7.0 mm, alternatively 7.0-7.5 mm, alternatively 7.5-8.0 mm, alternatively 8.0-8.5 mm, alternatively 8.5-9.0 mm, alternatively 9.0-9.5 mm and alternatively 9.5-10.0 mm. The preferred diameter is 2 mm. However, other shapes may be used such as the slit described above.

In step 3, the intermediate or masterbatch composite from step 2 is broken up into smaller pellets. This can be done using standard cutting techniques. For example, where the intermediate masterbatch composite is a string or cord it can be cut using a knife or scissors to form small pellets. The pellets can be 0.1-10 mm long, alternatively 0.1-0.5 mm, alternatively 0.5-1.0 mm, alternatively 1.0 mm to 1.5 mm, alternatively 1.5 to 2.0 mm, alternatively. 2.0 to 2.5 mm, alternatively 2.5 mm to 3.0 mm, alternatively. 3.0 to 3.5 mm, alternatively 3.5 mm to 4.0 mm, alternatively 4.0 to 4.5 mm, alternatively 4.5 mm to 5.0 mm, alternatively. 5.0 to 5.5 mm, alternatively 5.5 mm to 6.0 mm, alternatively, 6.0 mm to 6.5 mm, alternatively 6.5 to 7.0 mm, alternatively. 7.0 to 7.5 mm, alternatively 7.5 mm to 8.0 mm, alternatively. 8.0 to 8.5 mm, alternatively 8.5 mm to 9.0 mm, alternatively. 9.0 to 9.5 mm and alternatively 9.5 mm to 10.0 mm. The preferred length is 2 mm.

The pellets are then combined with those of a second polymer (bulk polymer) in step 4. The bulk polymer can be those discussed above. As discussed above, it can be the same or different from the core polymer in the color changeable indicator particles. Typical methods of combining the pellets and bulk polymer can be used, e.g. stirring, mixing, etc. In step 5 the combined mixture of masterbatch and bulk polymer pellets is then extruded using standard extrusion techniques. For examples, the combined mixture of masterbatch and bulk polymer pellets are fed into the barrel of an extruder, via its hopper. The material is gradually melted by the mechanical energy generated by turning screws and by heaters arranged along the barrel. The molten polymer is then forced into a die, which shapes the polymer into a shape that hardens during cooling. Typically the die is in the form of a slit, so that the extruded film is in the form of a sheet. Alternatively, the die will be a hole, so as to extrude a string or cord of the polymer material. The sheet or other extruded composite can be incorporated into or on a restricted, disposable, or limited use item or onto its packaging, for example.

The melting points of the core polymer and bulk polymer should be considered when determining the temperature to carry out the extrusion. In one embodiment, an extrusion temperature is selected that is higher than both the core polymer and bulk polymer. In another embodiment, an extrusion temperature is selected that is higher than the bulk polymer. In a preferred embodiment, the melting point of the core polymer is at or below that of the bulk polymer, as it produces a more homogeneous composite.

In one embodiment, organic plastic composites are created by mixing about 2 g of the color changeable indicator particles with about 18 g of powdered bulk polymer. This produces a 10% pigment 'master batch' powder which is then extruded into an approximately 2 mm diameter polymer 'string', which is subsequently cut up into pellets, approximately 3 mm long.

The temperature profile used for extruding the master batch pellets and final film depends upon the polymer that is being extruded. In certain embodiments, the bulk polymer is LDPE. For example, if LDPE is both the core polymer and bulk polymer then the temperature profile across the extruder is set to increase gradually from 90° C. at the feed zone, to 140° C. at the outlet, i.e. the 'string' die and the temperature profile used in the extruder was: 90, 115, 125, 135 and 136° C., respectively. In certain embodiments, the pigment master batch mixture feed hopper rate was 40 rpm and the extruder screw speed was 80 rpm and the pelletizer speed: 0.5 m min$^{-1}$.

Once the master batch pellets has been prepared, the pellets are then extruded neat as a film using a sheet die (width ca. 150 mm, for example). The thermal processing conditions for producing the all organic plastic film are the same as used to make the master batch 'string', provided the core polymer and bulk polymer are the same. In certain embodiments, the feed hopper rate was 20 rpm, the extruder screw speed 80 rpm, and the extruded film was such that a film typically had an average thickness of 50 µm. When polypropylene (PP) is used as the core polymer, the extruder temperature profile used is: 90-130-150-160-150-170° C. When PP was both core polymer and bulk polymer the extruder temperature profile used is: 130-150-160-180-160-180° C.

Various widths of films are contemplated, depending on the sheet die that is utilized. For example, film widths of 1 mm to several meters can be produced via polymer extrusion. With respect to film thicknesses, in certain embodiments, the average film thickness is about 50 µm. In other embodiments, the average film thickness is about 40-70 µm. Alternatively the film thickness can be 20-30 µm, or 30-40 µm, or 40-50 µm, or 50-60 µm, or 60-70 µm, or 70-80 µm, or 80-90 µm, or 90-100 µm, or 100-110 µm, or 110-120 µm, or 120-130 µm, or 130-140 µm, or 140-150 µm, or 150-160 µm, or 160-170 µm, or 170-180 µm, or 180-190 µm, or 190-200 µm.

In one embodiment, LDPE is utilized as the core polymer. The thermal processing conditions for extruding LDPE are as follows: 90° C. (at the feed zone of the extruder), increasing to 110-125-135° C. (across the barrel of the extruder) and finally 140° C. (at the end zone of the extruder). The melting point of LDPE is 120° C., and when extruding the polymers, the temperature of final zone is usually at least 10° C. higher than the melting point.

In one embodiment, color changeable indicator particles are prepared by adding about 0.2 g of pH sensitive dye powder to about 2 g of the core-polymer powder. In certain embodiments, the dye is m-cresol purple (MCP). In other embodiments, the dye is bromophenol blue (BPB). The dye powder and the polymer powder are stirred together to produce a homogeneous mixture and 100 mL of solvent then added to create a highly colored dispersion of polymer core particles in a dissolved dye solution. In the case of an ammonia sensor, which often uses BPB, no additional agent is required. However, in the case of a $CO_2$ indicator, often using MCP, then approx. 3 mL of a 40% base solution in water is added. In some embodiments, the base is tetra butyl ammonium hydroxide, TBAOH. The final dispersion is then stirred on a magnetic plate for about 8 h to ensure complete mixing and dissolution of the solvent-soluble components. The solvent is then evaporated under vacuum so as to produce a dry powder that is then ground using a mortar and pestle. In certain embodiments, the solvent is ethanol (EtOH).

Example 1

Methods used to characterize the films are illustrated for an exemplary $CO_2$-sensitive organic film: m-Cresol Purple (MCP)/low density polyehtylene (LDPE)/LDPE. Films were generated by the methods outlined above. In this example, both the core polymer and the bulk polymer are LDPE. Thickness for this film was measured at 55 um.

Figure 4A:
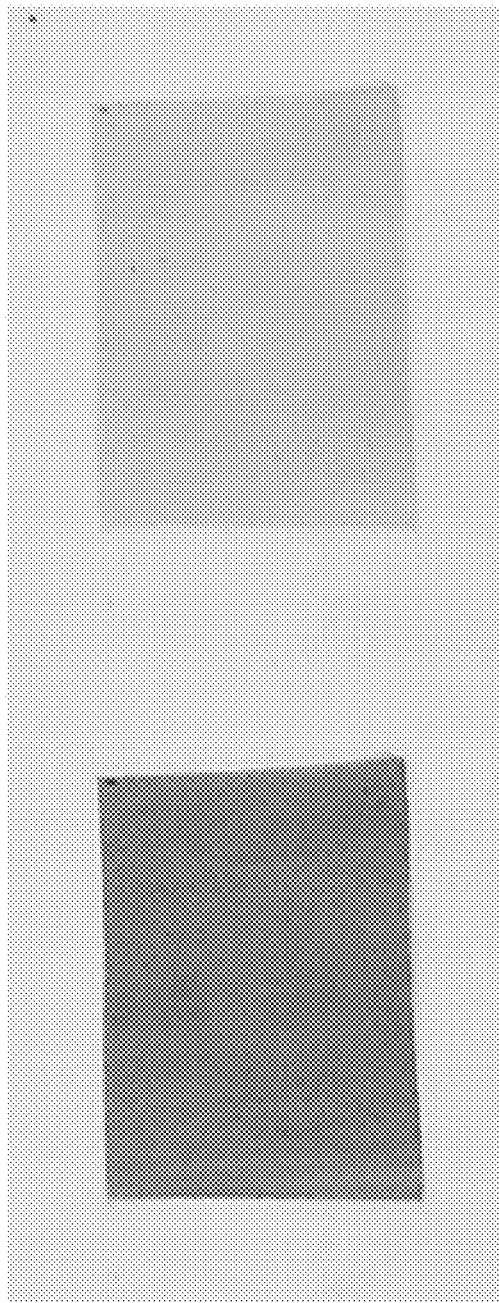
FIGS. 4A-F show photographs of $CO_2$-sensitive films in the absence (left hand side image) and presence (right-hand side image) of $CO_2$.
Figure 4B:
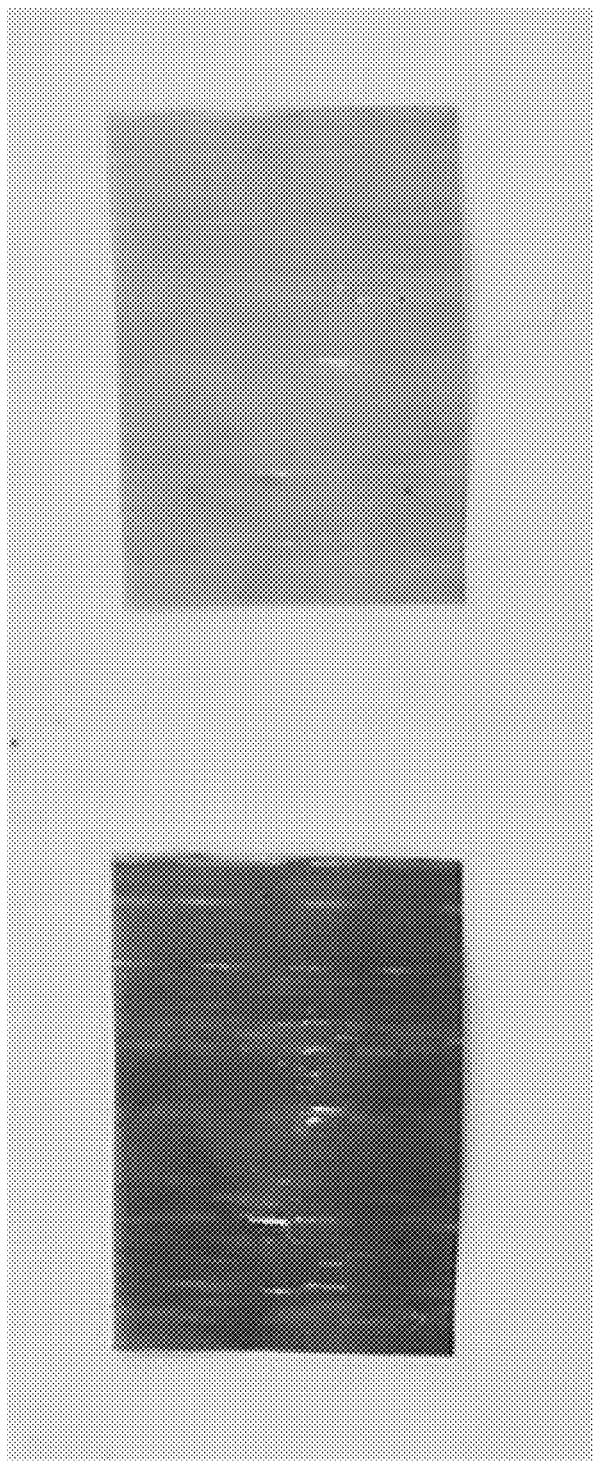
Figure 4C:
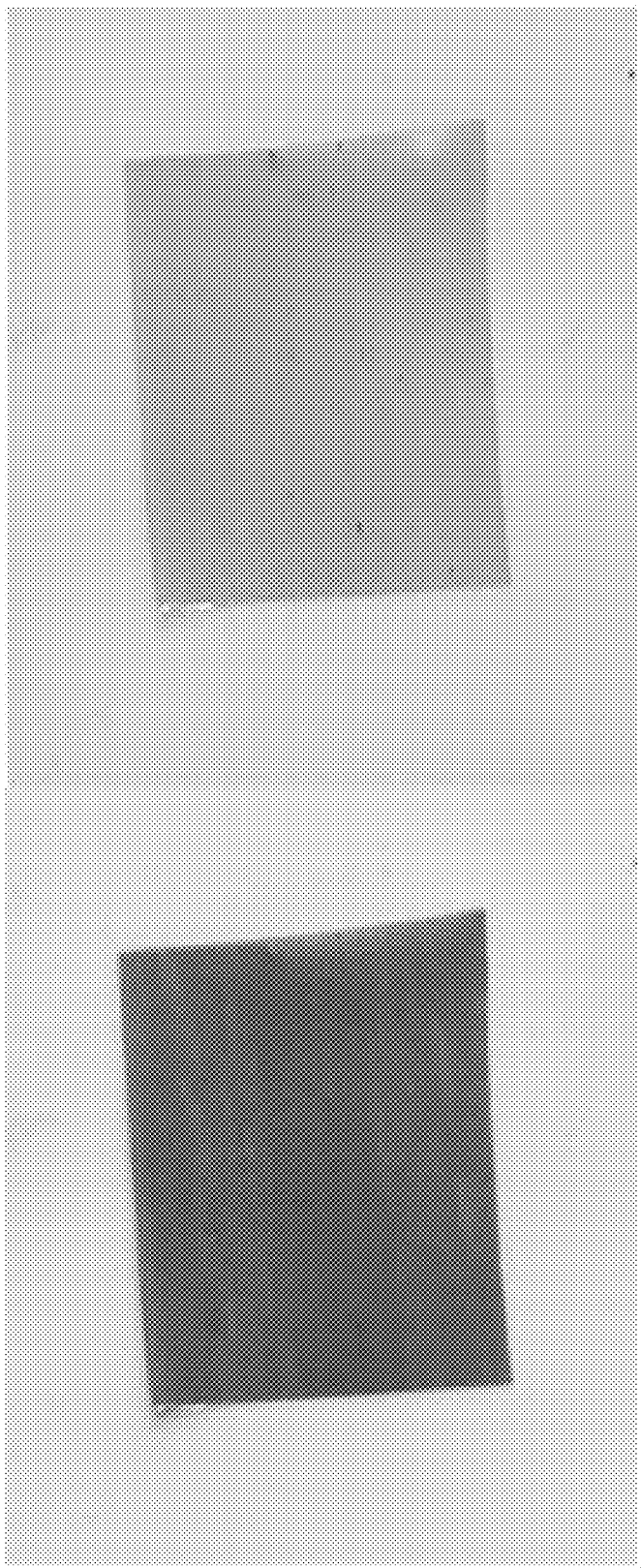
Figure 4D:
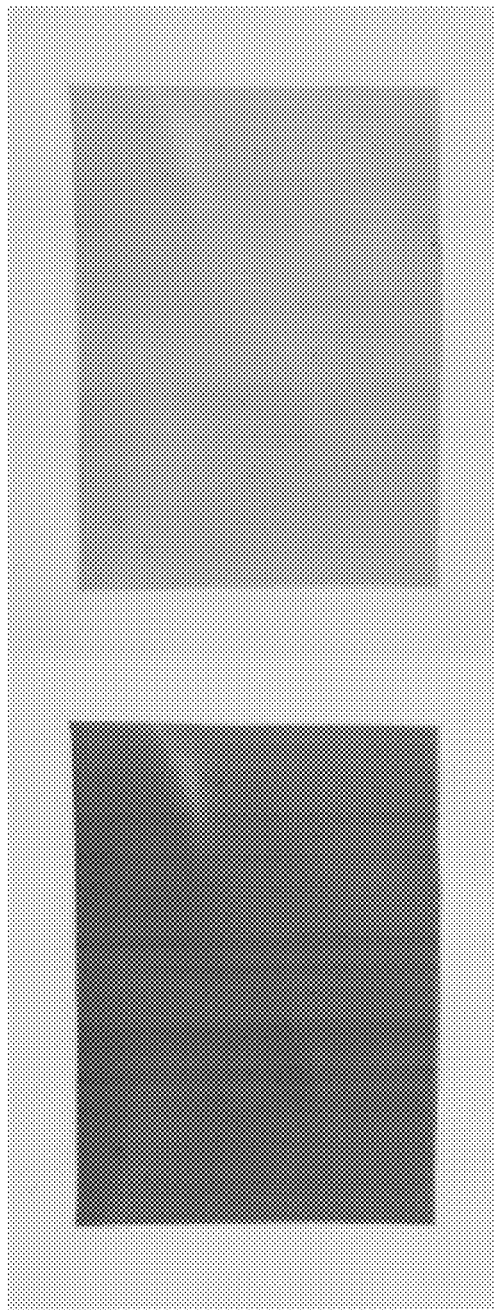
Figure 4E:
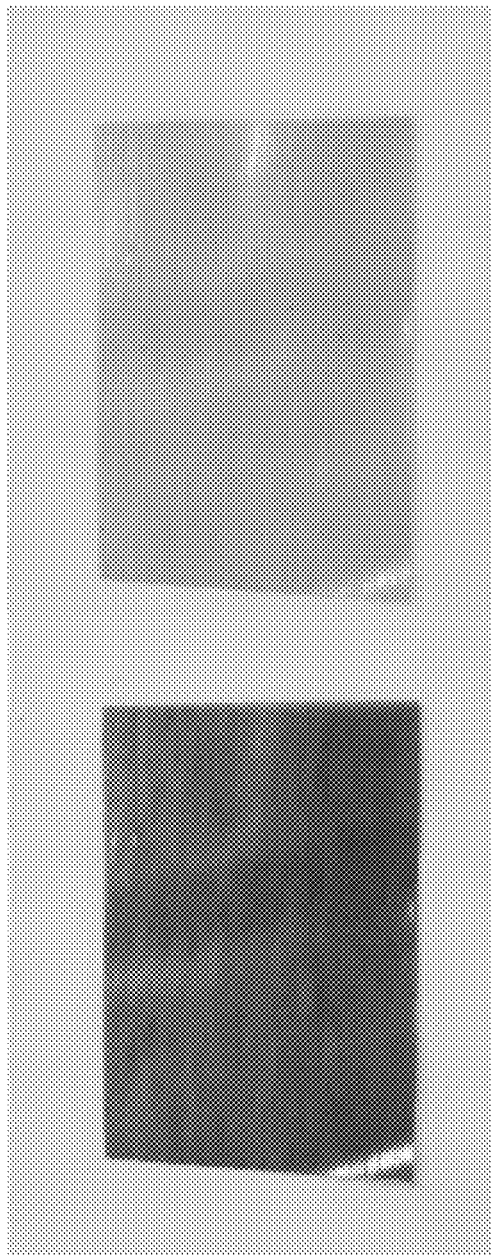
Figure 4F:
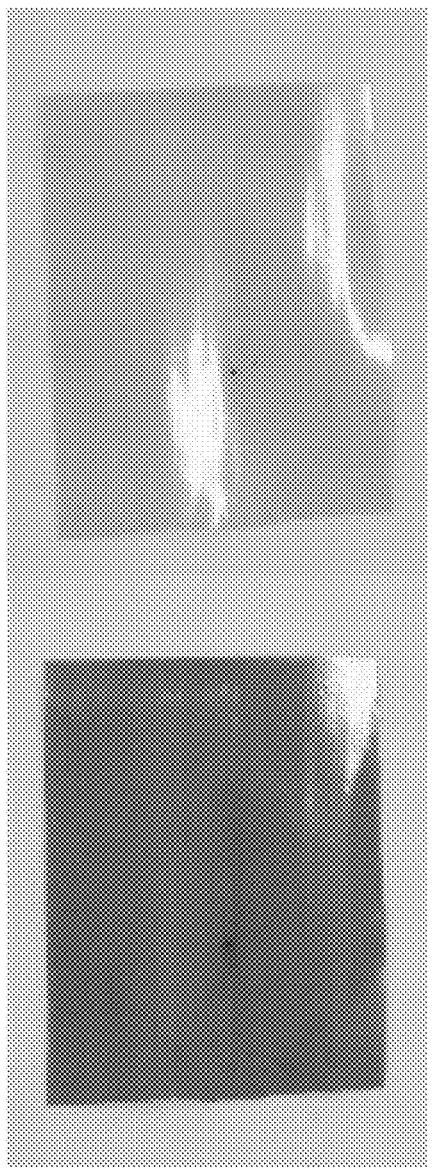
Figure 5A:
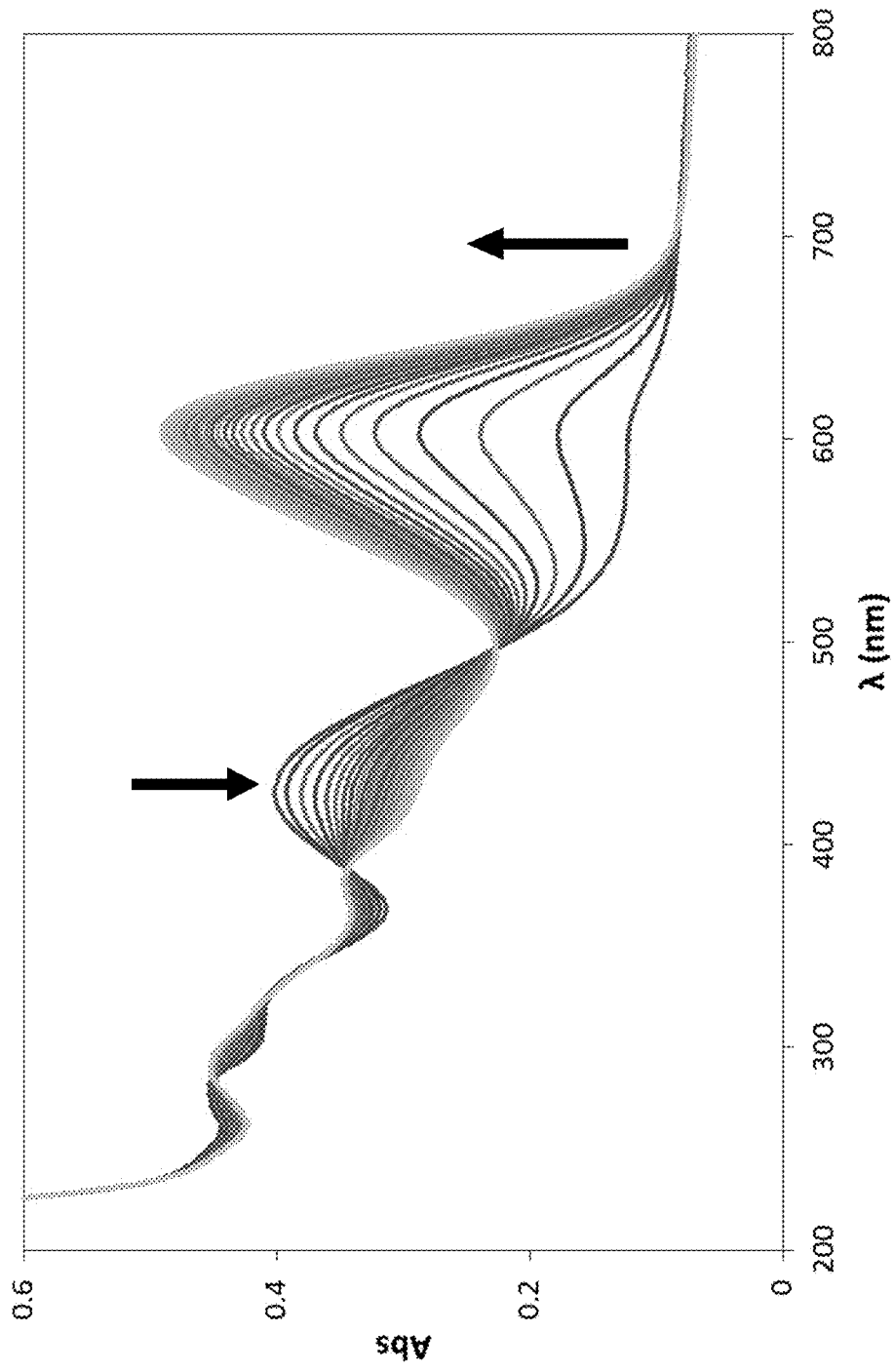
FIGS. 5A-C show recovery spectra of plastic films after exposure to 100% $CO_2$ and recovery in the air.
Figure 5B:
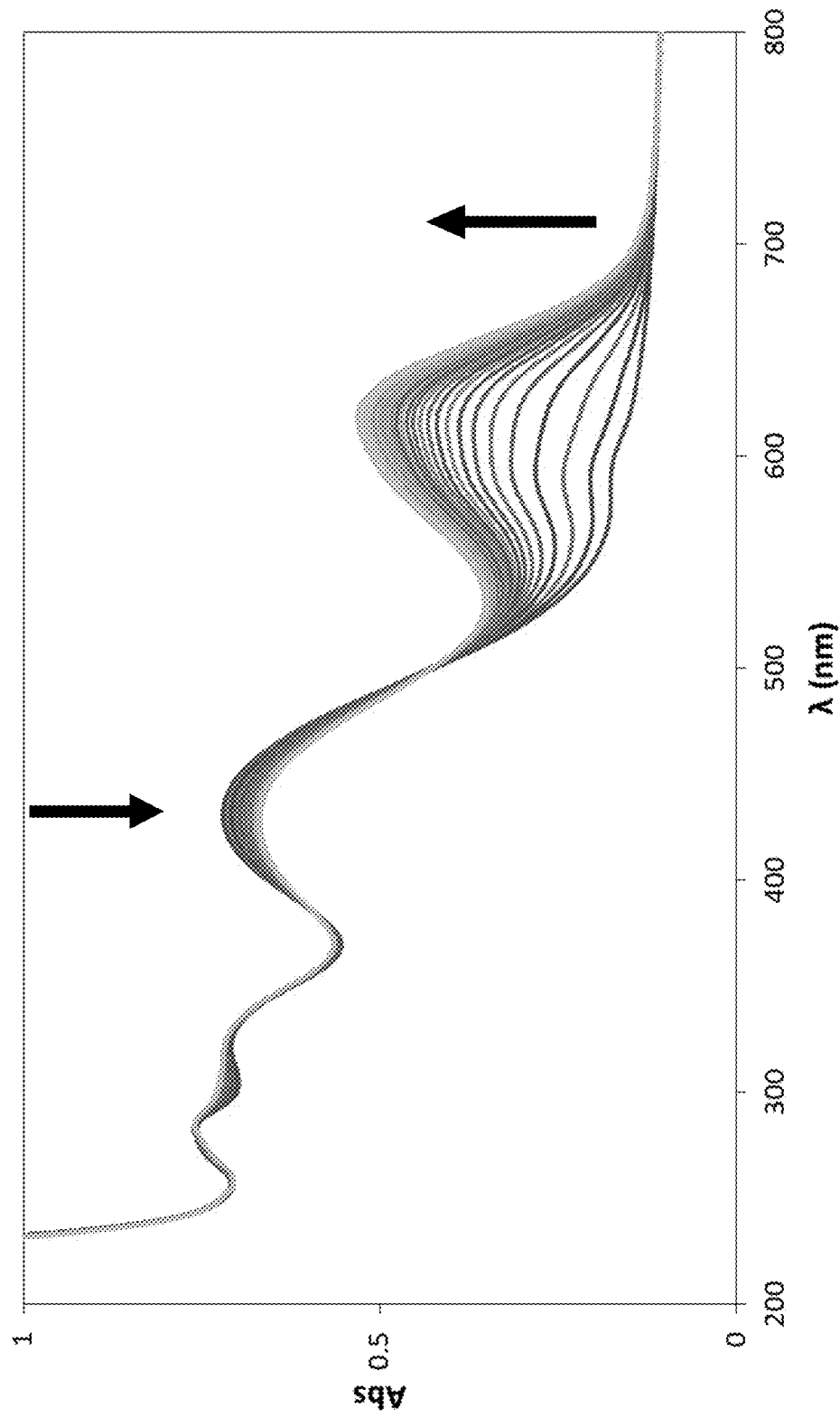
Figure 5C:
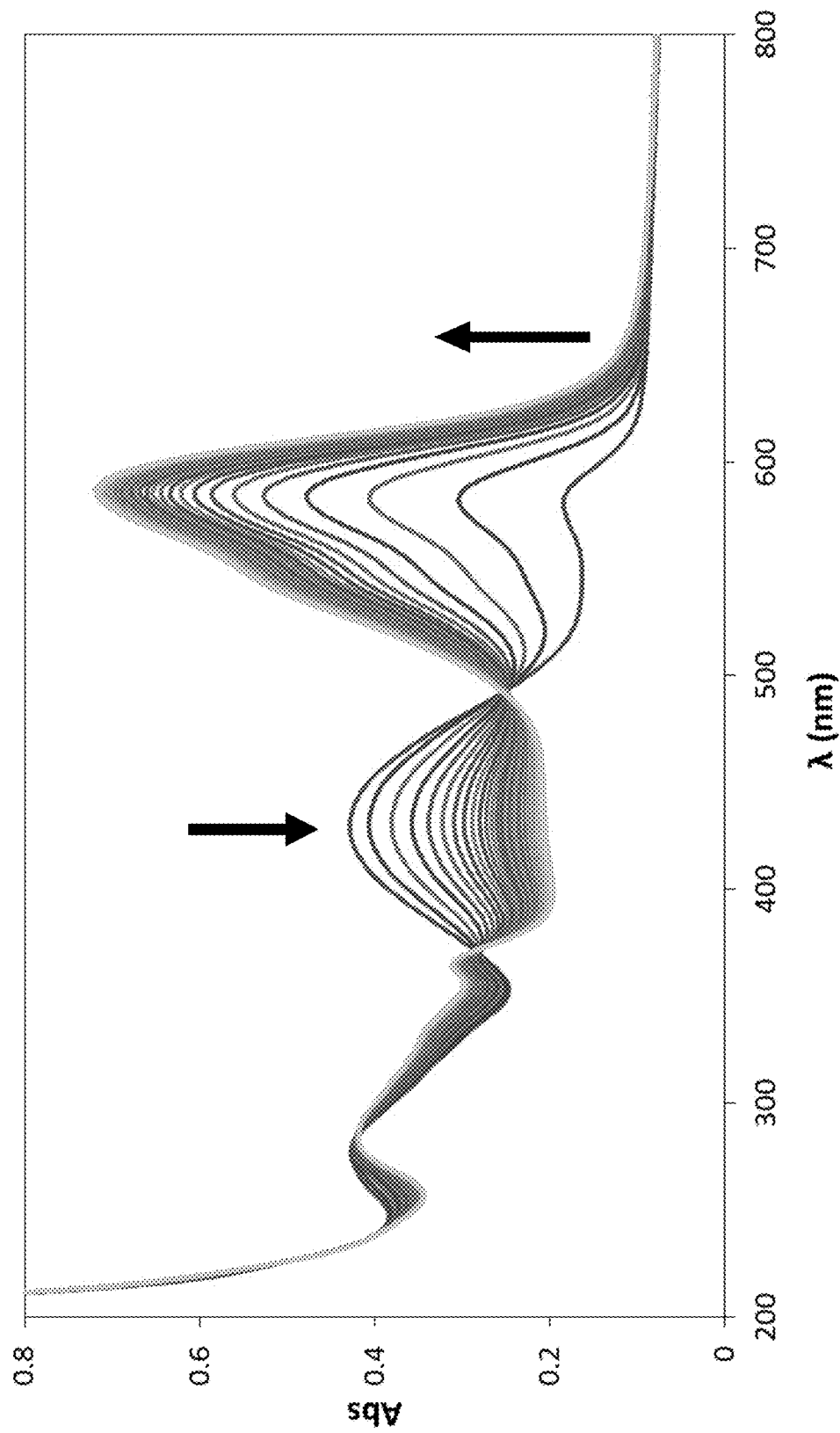

Color change response to the detected chemical substance is shown by color before and after exposure. All films were exposed to the detected chemical substance under test, for example, $CO_2$ or ammonia, and the appearance of each film before and after exposure was recorded. See FIGS. 4A-F and 10A-C. A typical example is illustrated in FIG. 4A for the MCP/LDPE/LDPE $CO_2$-sensitive film, which is blue in the absence of $CO_2$ and yellow in its presence (100% $CO_2$). Recovery spectra of the films were also recorded. See FIGS. 5A-C and 11A-C. These spectra show the spectrophotometric response of the films when exposed to the detected chemical substance (e.g. $CO_2$ or ammonia), then left to recover in air. For example, FIG. 5A illustrates such a recovery spectrum for a typical MCP/LDPE/LDPE $CO_2$-sensitive film.

The MCP/LDPE/LDPE $CO_2$ indicator is an example of a Q+D−·xH₂O type indicator, where D−, is the de-protonated form of the pH-sensitive dye, MCP in this case, and Q+ is a quaternary ammonium ion, tetrabutyl ammonium, in this case. The general mechanism of Q+D−·xH₂O-based $CO_2$ indicator is summarized by reaction equation (1) below, in which the deprotonated pH sensitive dye, Q+D−·xH₂O, is reversibly protonated when $CO_2$ is present, to form Q+HCO₃−·(x-1)H₂O·DH, resulting in a color (or fluorescence) change, from A to B (in this case blue to yellow), as D−, is protonated to form DH.

$$Q^+D^-\cdot xH_2O + CO_2 \leftrightarrow Q^+HCO_3^-\cdot(x-1)H_2O + DH \quad (1)$$

Color/Fluorescence A    Color/Fluorescence B

Figure 6A:
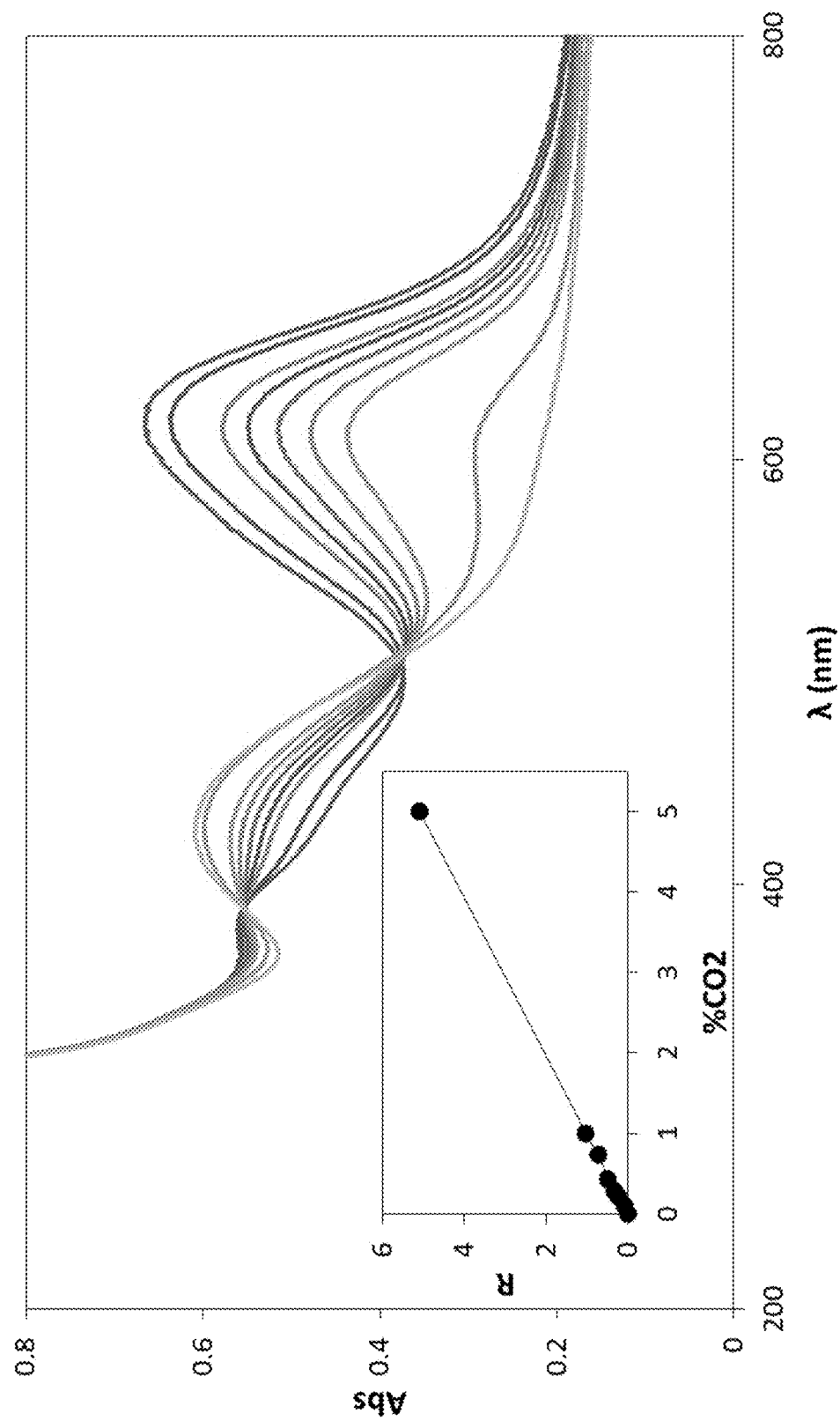
FIGS. 6A-F show UV-vis absorption spectra of plastic films when exposed to different percentages of $CO_2$ (large diagrams). The inset (small) diagrams are plots of the data in the form of R versus % $CO_2$.

As indicated by this equilibrium, with increasing $CO_2$ there should be an increase in the color of the protonated form of the dye (DH) and a commensurate decrease in the color of the deprotonated form of the dye, D−. These changes in color can be quantified via UV/Visible absorption spectrophotometry. See FIGS. 6A-F. For example, FIG. 6A illustrates the measured change in the absorption spectrum of a typical MCP/LDPE/LDPE $CO_2$-sensitive film with increasing $CO_2$.

General parameter, R, the ratio of the concentrations of the protonated to deprotonated forms of the dye, which is calculated using the experimentally measured absorbance, for a color-based $CO_2$ sensor at a known % $CO_2$, made at the wavelength of maximum absorbance for D− alone, i.e. $\lambda_{max}(D^-)$. R is a function of % $CO_2$ and from reaction (1), it follows:

$$R = (Abs_0 - Abs)/(Abs - Abs_4) = [HD]/[D^-] \quad (2)$$

where [HD] and [D−] are the concentrations of the protonated and deprotonated forms of the dye, respectively. $Abs_0$ is the value of absorbance due to the dye at $\lambda_{max}(D^-)$ when % $CO_2$=0 (i.e. when all the dye is in its deprotonated form) and $Abs_\infty$ is the absorbance of the film when all the dye is in its protonated form, HD, i.e. when % $CO_2 = \infty$.

The parameter R is a measure of the transformation of the dye from the deprotonated to protonated form due to the presence of $CO_2$ and it follows from reaction (1), that:

$$R = [HD]/[D^-] = \alpha \times \% CO_2 \quad (3)$$

where α is a proportionality constant (units: %⁻¹) which provides a measure of the sensitivity of the $CO_2$-sensitive optical sensor under test (5).

A more accessible, direct and quick measure of the sensitivity of a $CO_2$ optical sensor is provided by the value of the % $CO_2$ at which the normalized optical signal, S, is equal to ½, henceforth referred to as % $CO_2(S=1/2)$. At the % $CO_2(S=1/2)$ the concentrations of the protonated and deprotonated forms of the dye are the same and R=1 and so, from equation (3), % $CO_2(S=1/2) = 1/\alpha$. It is more convenient to use % $CO_2(S=1/2)$ values to compare the sensitivities of different $CO_2$ indicators, than refer to their measured values of α, and clearly the lower the value of % $CO_2(S=1/2)$ for $CO_2$ sensor, the greater its sensitivity. Thus α is a relevant sensitivity parameter to monitor in such films.

Solvent based solid, dry carbon dioxide sensors can utilize of a phase transfer agent, PTA, that is able to extract the anionic form of the colorimetric pH indicator, from the highly polar protic medium into the less polar environment of the polymer/plasticizer. The water associated with the dye is also delivered to the hydrophobic polymer via the PTA. In such plastic thin $CO_2$ film sensors, the equilibrium set up between the dye and carbon dioxide is represented by equation (1) above.

In the case of the MCP/LDPE/LDPE plastic film, a plot of the absorbance data at 615 nm (where the D− form of MCP absorbs most strongly) in the form of R vs % $CO_2$, generally yields a straight line. Specifically, in FIG. 6A, UV-vis absorption spectra of an exemplary MCP/LDPE/LDPE plastic film is shown. Films were exposed to the following different percentages of $CO_2$ (from top to bottom at 615 nm): 0, 0.1, 0.21, 0.29, 0.43, 0.73, 1, 5 and 100%. The inset (small) diagram—for 615 nm, is a plot of the data in the main diagram in the form of R vs % $CO_2$. The gradient of the line of best fit, α, is=1/% $CO_2(S=1/2)$. In this example, % $CO_2(S=1/2)$=0.99% (see also FIG. 7, first entry). Specifically, this data reveals an R value (at 5% $CO_2$) of 5.1 and an α value of 1.01±0.01 ($R^2$=0.9996) where R=$(Abs_0-Abs)/(Abs-Abs_\infty)$=α×% $CO_2$.

Figure 7:
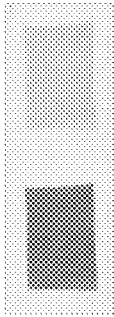
FIG. 7 shows characteristics of $CO_2$-sensitive films using different color changeable indicators.
Figure 7:
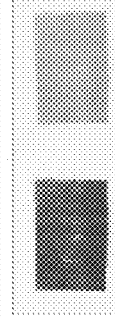
Figure 7:
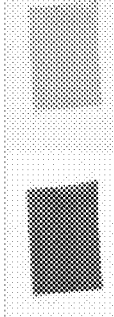
Figure 8A:
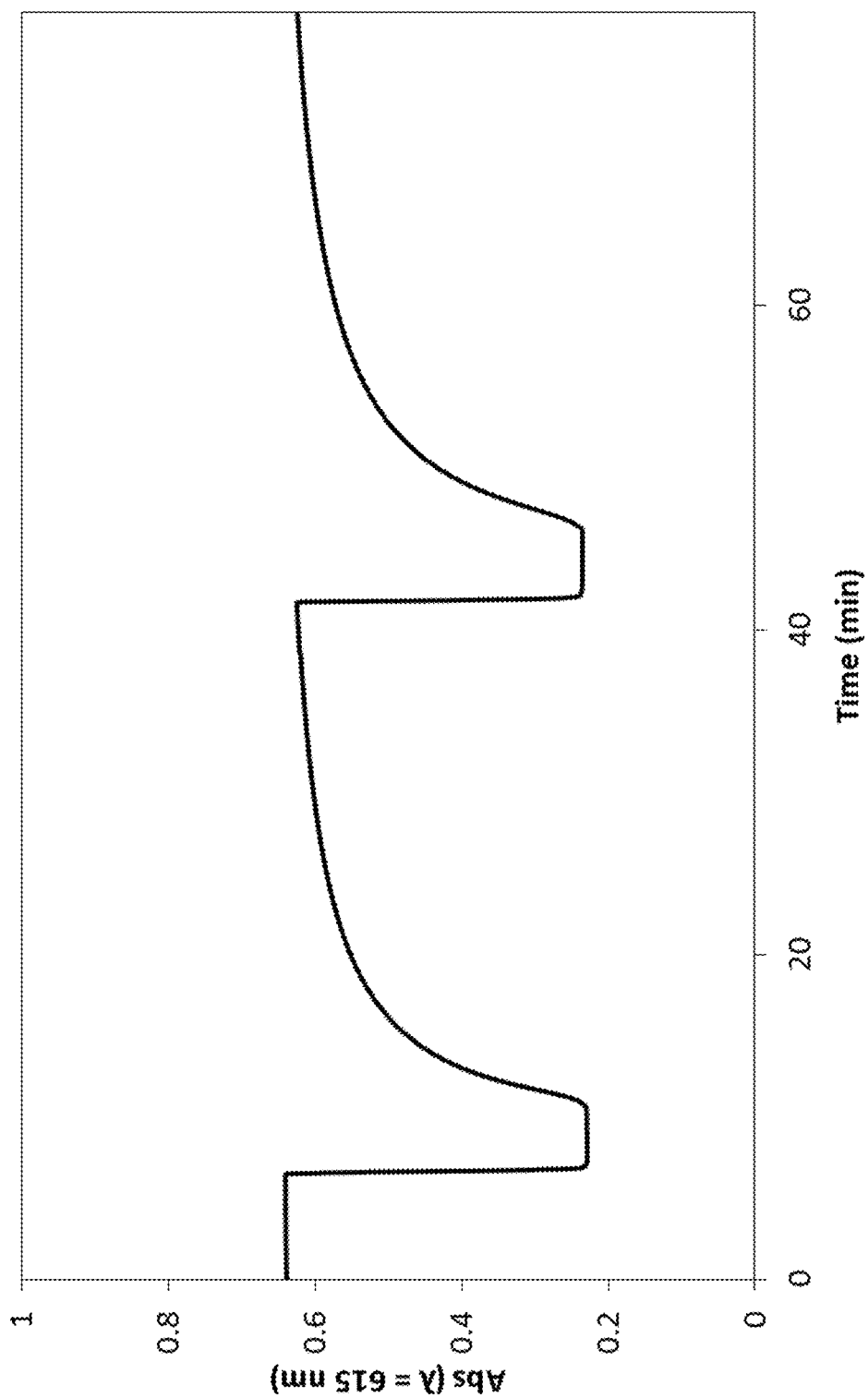
FIGS. 8A-F show absorbance vs time profiles recorded for plastic films upon repeated exposure to alternative streams of 100% $CO_2$ and air.
Figure 8B:
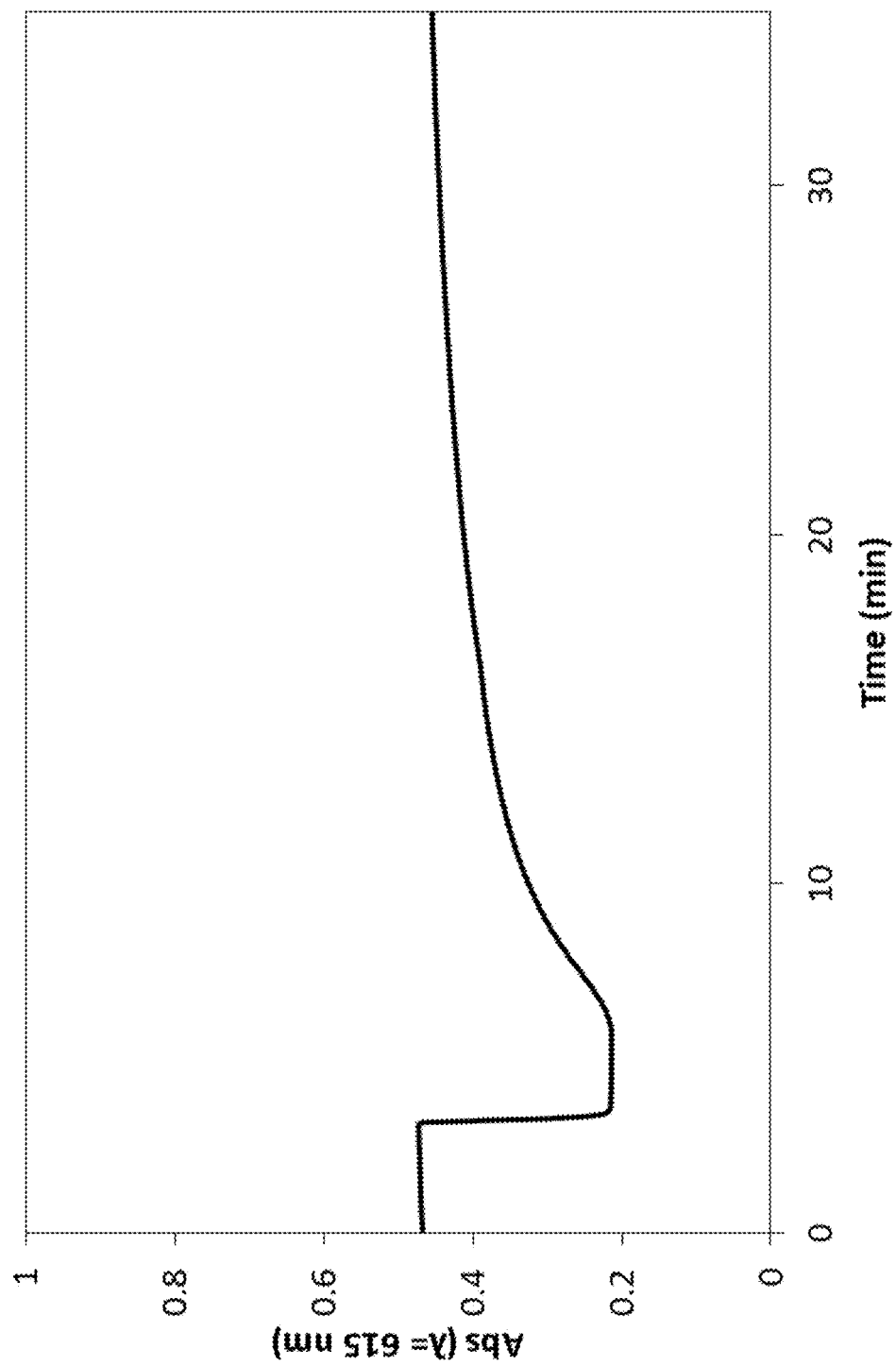
Figure 8C:
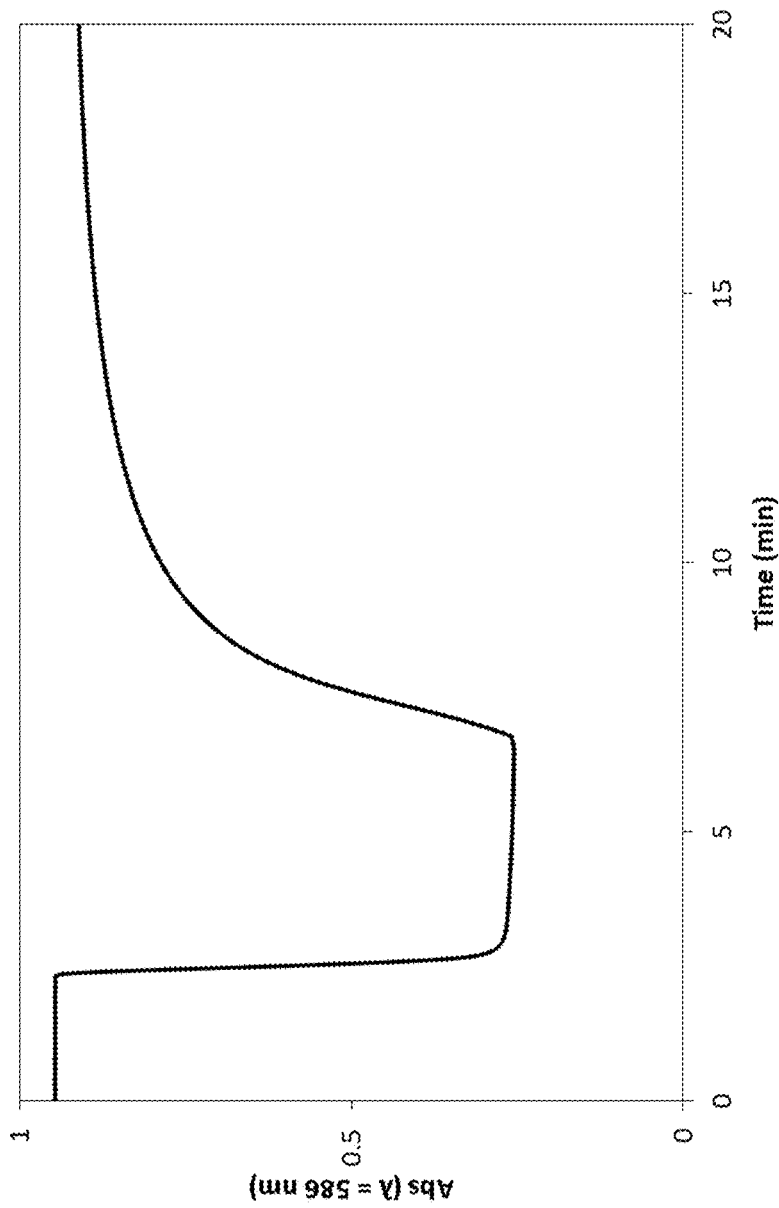
Figure 8D:
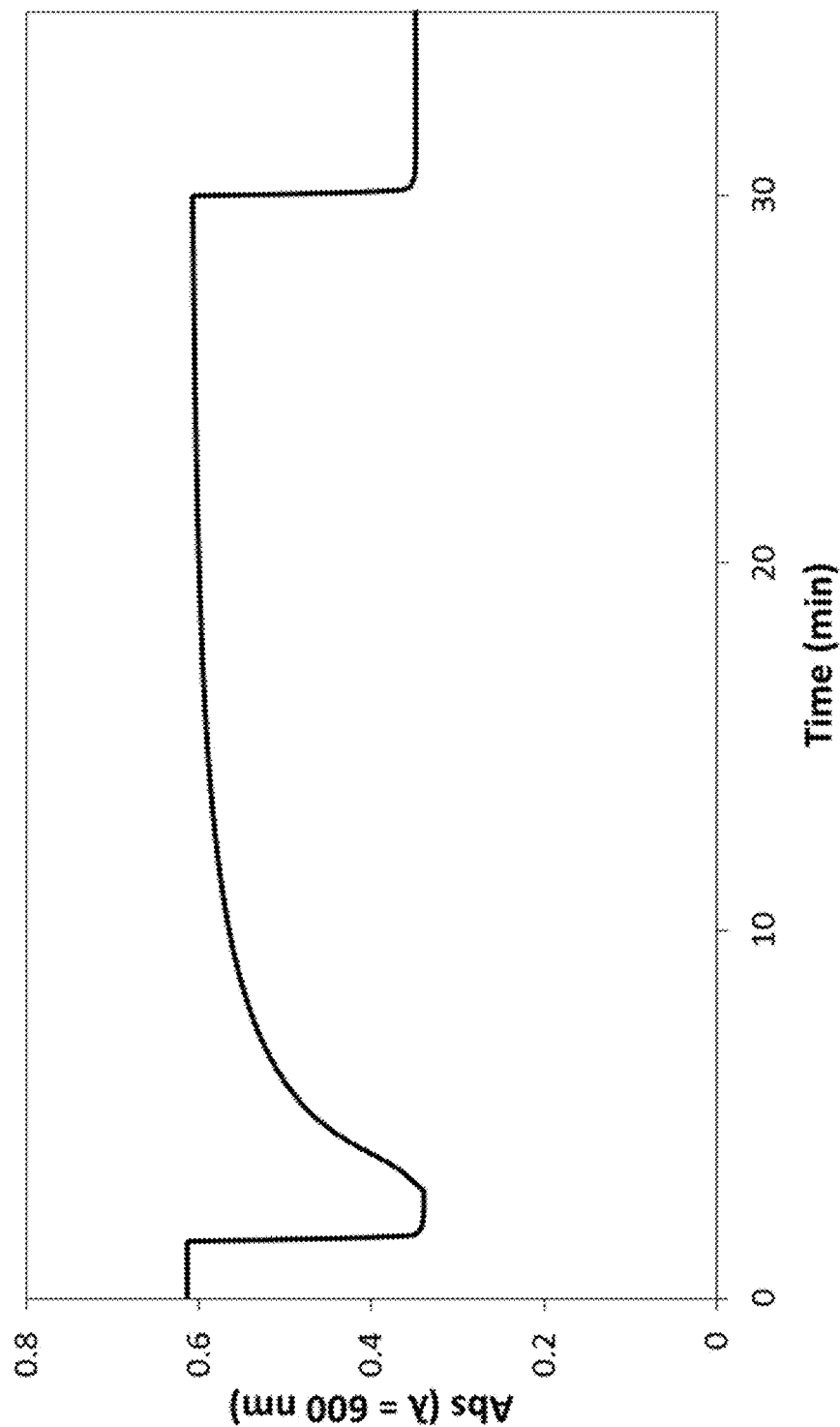
Figure 8E:
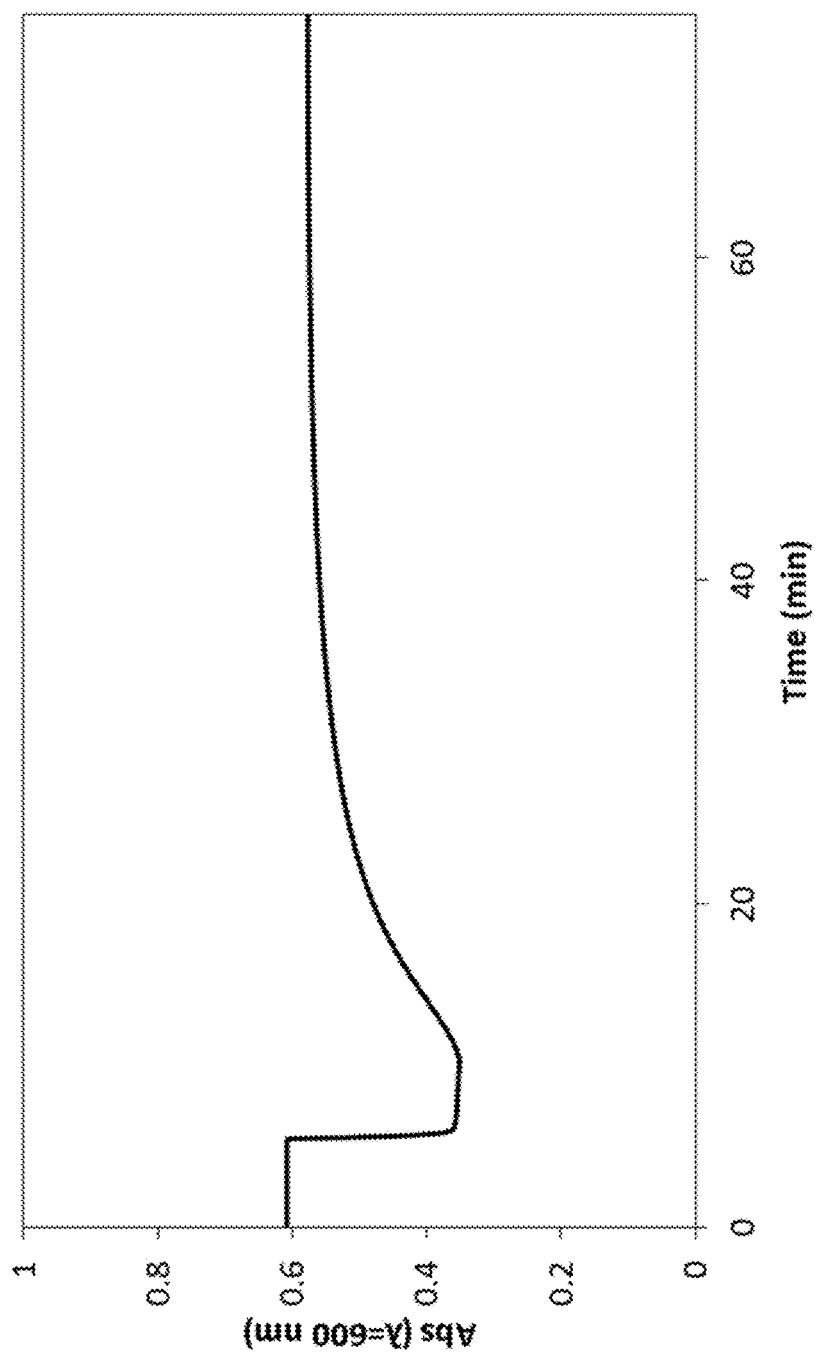
Figure 8F:
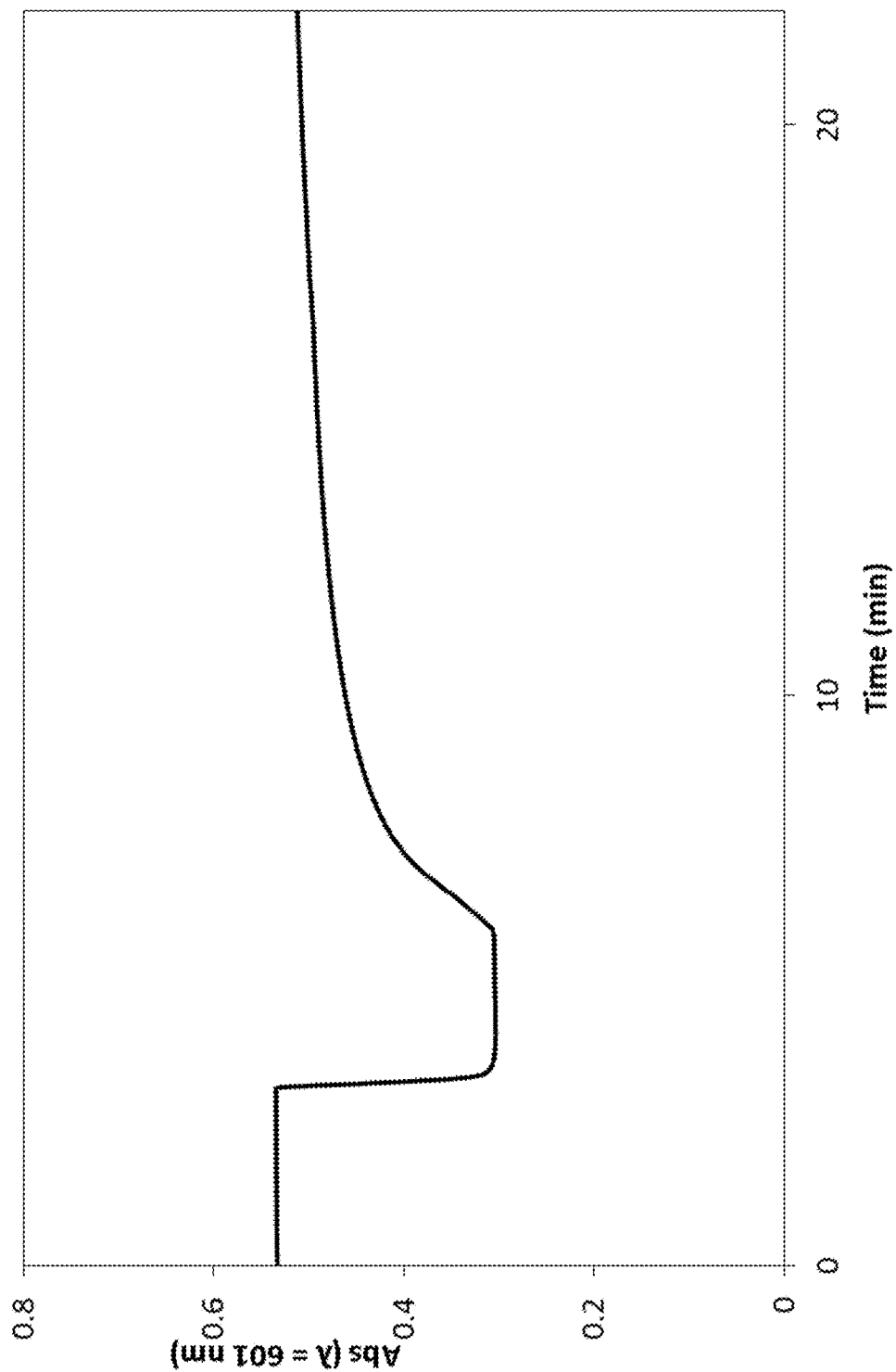

This measure of the sensitivity of $CO_2$-sensitive plastic films was recorded for each sample, see, e.g., FIG. 7 (column denoted % $CO_2$ (S=1/2)). The sensitivities of all $CO_2$-sensitive films were measured using this method. Another advantage found with these organic plastic film sensors is how rapidly they respond and recover to a change in the detected chemical substance level. In the case of the $CO_2$-sensitive films, the time taken for the plastic film to undergo 50% of its color change: upon exposure to 100% $CO_2$, i.e. the 50% response time (t50↓), was measured. In addition the time taken to recover 50% of its color, when exposed to air, after sitting in 100% $CO_2$, was also measured, i.e. 50% recovery time (t50↑). FIGS. 8A-F illustrates the response and recovery profiles for plastic films of the present technology. For example, FIG. 8A shows response and recovery profiles recorded for the same MCP/LDPE/LDPE plastic film, from which values of t50↓=0.2 min t50↑=3.3 min, were calculated and entered into FIG. 7, 1$^{st}$ entry. The response and recovery times of all the $CO_2$-sensitive films of the examples were determined in this way and entered into FIGS. 7 and 9.

Example 2

Another $CO_2$-sensitive organic film was created and characterized as described above. In this example, the film is TB (Thymol blue)-LDPE-LDPE. As before, color change response to the detected chemical substance is shown by color before and after exposure. See FIG. 4B. In this example, both the core polymer and the bulk polymer are LDPE. Thickness for this film was measured at 60 um. Recovery spectra of this film was also recorded, see FIG. 5B.

Figure 6B:
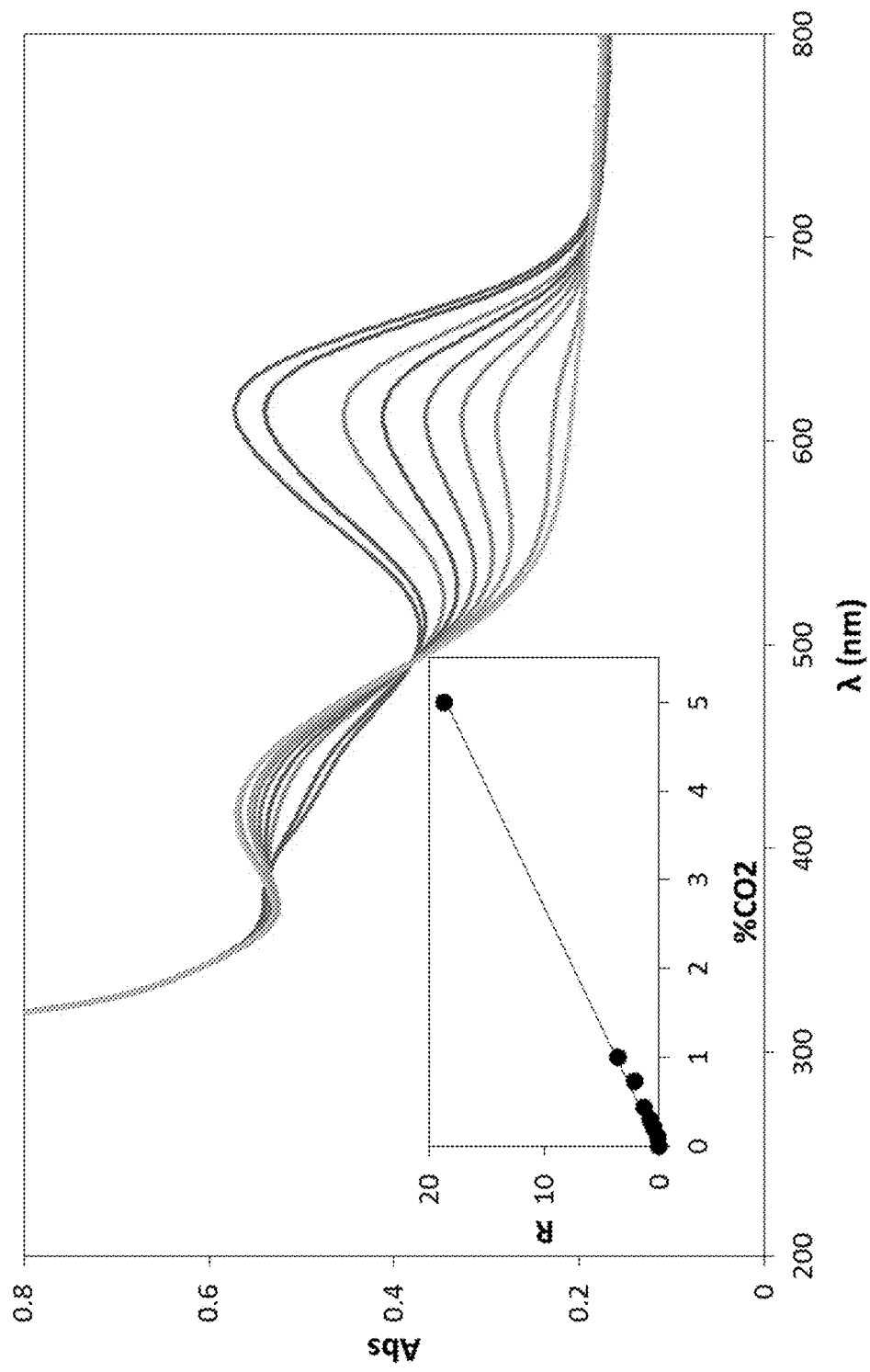

The value of α was calculated from UV-vis absorption spectra as before. FIG. 6B shows the spectra of the TB-LDPE-LDPE plastic film when exposed to the following different percentages of $CO_2$ (from top to bottom at 615 nm):

0, 0.1, 0.21, 0.29, 0.43, 0.73, 1, 5 and 100%. This data reveals, via the insert plot for data at 615 nm, a R value (at 5% $CO_2$) of 18.7 and an α value of 3.79±0.05 ($R^2$=0.9991) where R=($Abs_0$–Abs)/(Abs–Absoc)=α % $CO_2$. Thus $CO_2$ (S=1/2)=0.26. See FIG. 7, second entry.

As before, a response and recovery profile of the organic plastic film sensor was tested by purging alternative streams of $CO_2$ and air. See FIG. 8B, from which the 50% response time ($t_{50\ \downarrow}$)=0.2 min and 50% recovery time ($t_{50\uparrow}$)=4.1 min can be calculated. See FIG. 7, $2^{nd}$ entry.

Example 3

Another $CO_2$-sensitive organic film was created and characterized as described above. In this example, the film is PR (Phenol red)-LDPE-LDPE. As before, color change response to the detected chemical substance is shown by color before and after exposure. See FIG. 4C. In this example, both the core polymer and the bulk polymer are LDPE. Thickness for this film was measured at 52 um. Recovery spectra of this film was also recorded, see FIG. 5C.

Figure 6C:
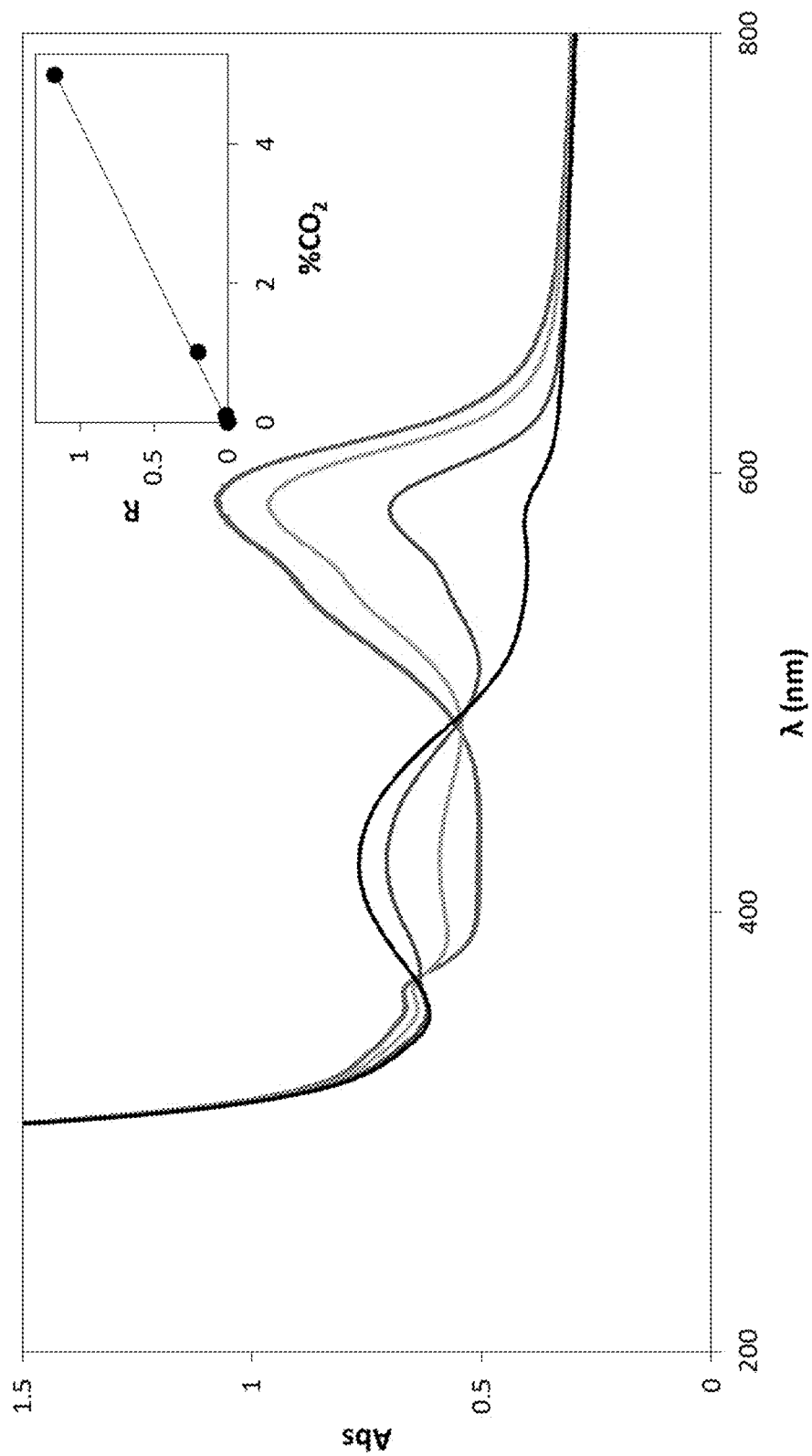

The value of α was calculated from UV-vis absorption spectra as before. FIG. 6C shows the spectra of the PR-LDPE-LDPE plastic film when exposed to the following different percentages of $CO_2$ (from top to bottom at 586 nm): 0, 0.1, 1, 5 and 100%. This data reveals, via the insert plot for data at 586 nm, a R value (at 5% $CO_2$) of 1.7 and an α value of 0.24±0.01 ($R^2$=0.9995) where R=($Abs_0$–Abs)/(Abs–Abs∞)=α % $CO_2$. Thus $CO_2$(S=1/2)=4.2. See FIG. 7, $3^{rd}$ entry.

As before, a response and recovery profile of PR-LDPE-LDPE plastic film was tested by purging alternative streams of $CO_2$ and air. See FIG. 8C, from which the 50% response time ($t_{50\downarrow}$)=0.2 min and 50% recovery time ($t_{50\_}$)=1.5 min can be calculated. See FIG. 7, third entry.

Examples 4-6

More $CO_2$-sensitive organic films were generated with MCP as the dye to investigate the difference in properties of the film brought about when the polymer core is changed. In these samples, the core polymer differs and the bulk polymer is LDPE. See FIG. 9 (the sample in FIG. 9, first entry is the same as in Example 1). These films were also created and characterized as delineated above.

As before, color change response to the detected chemical substance is shown by color before and after exposure. In Example 4, a 10% pigmented MCP-Polystyrene (PS)-LDPE film was created; see FIG. 4D. In this example, the core polymer is PS and the bulk polymer is LDPE. Thickness for this film was measured at 45 um. In Example 5, a 10% pigmented MCP-PMMA-LDPE plastic film was created; see FIG. 4E. In this example, the core polymer is PMMA and the bulk polymer is LDPE. Thickness for this film was measured at 58 um. In Example 6, a MCP-PP-LDPE film was created; see FIG. 4F. In this example, the core polymer is PP and the bulk polymer is LDPE. Thickness for this film was measured at 55 um.

Figure 6D:
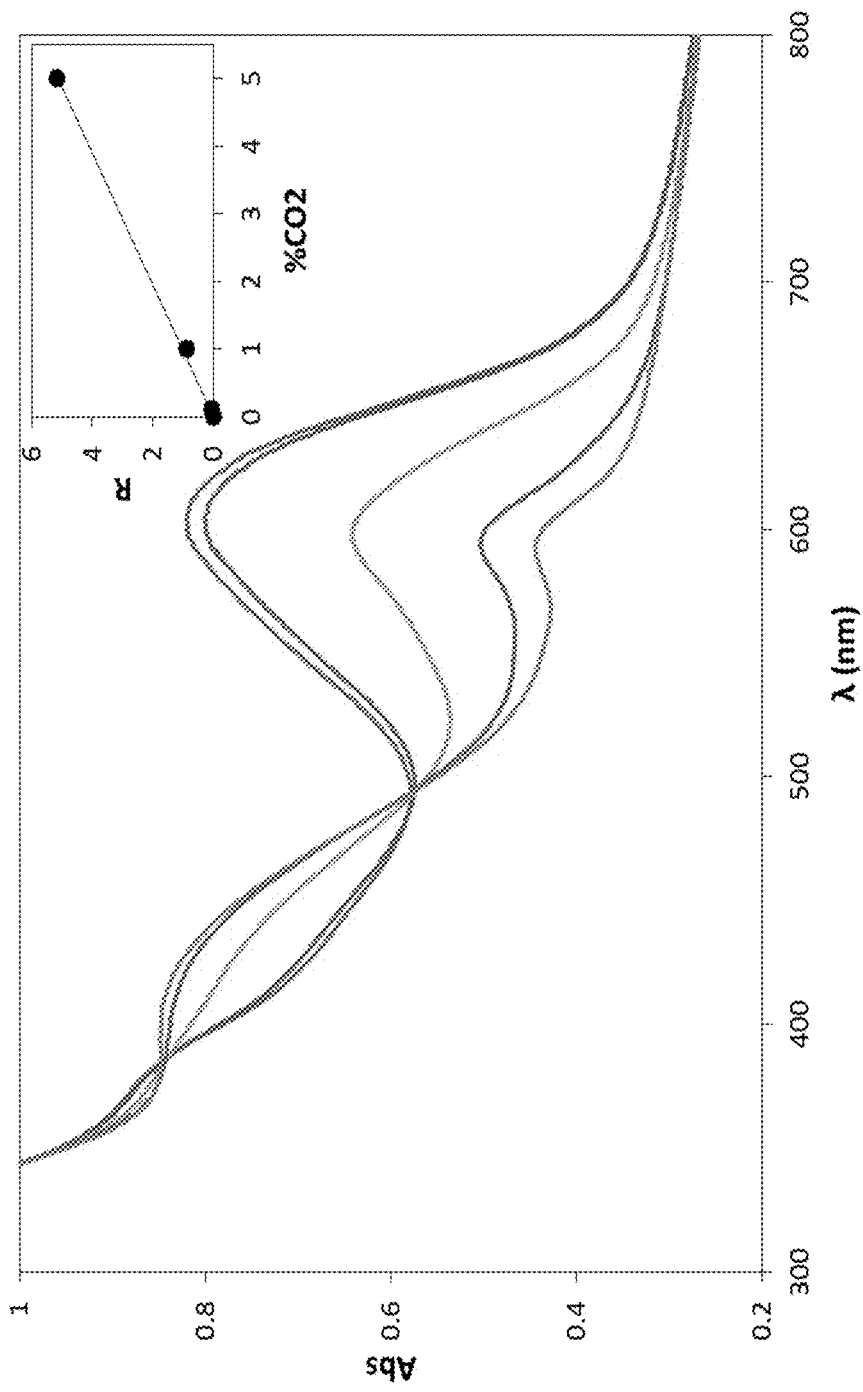

The value of a was also calculated from UV-vis absorption spectra as before. FIG. 6D shows the spectra of the film of Example 4 (MCP-PS-LDPE) when exposed to the following different percentages of $CO_2$ (from top to bottom at 600 nm): 0, 0.1, 1, 5 and 100%. This data reveals via the insert plot for data at 600 nm, a R value (at 5% $CO_2$) of 5.2 and an α value of 1.04±0.02 ($R^2$=0.9992) where R=($Abs_0$–Abs)/(Abs–Abs∞)=α % $CO_2$. Thus $CO_2$(S=1/2)=0.96. See FIG. 9, $2^{nd}$ entry.

Figure 6E:
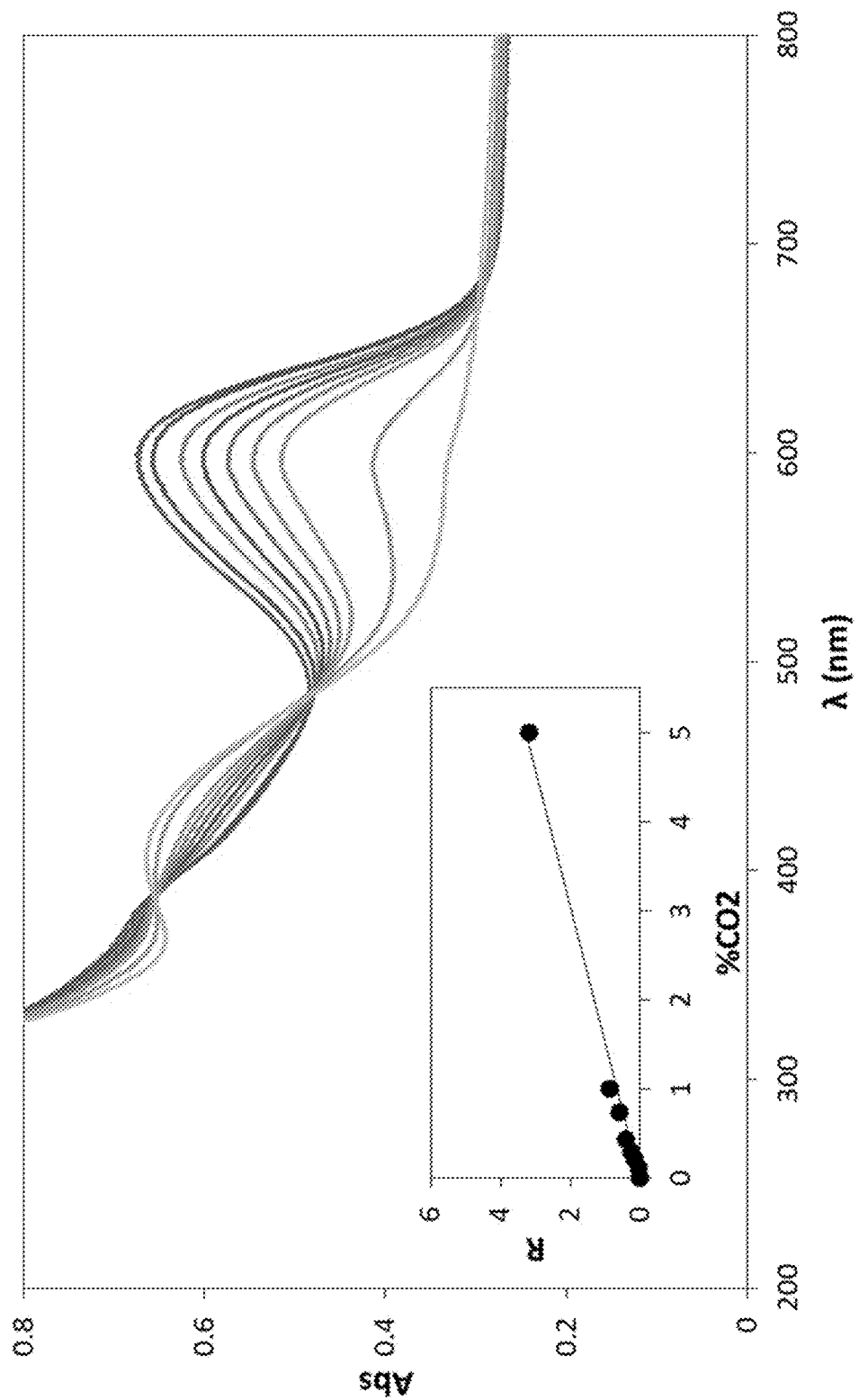

FIG. 6E shows the spectra of the film of Example 5 (MCP-PMMA-LDPE) when exposed to the following different percentages of $CO_2$ (from top to bottom at 600 nm): 0, 0.1, 0.21, 0.29, 0.43, 0.73, 1, 5 and 100%. This data reveals via the insert plot for data at 600 nm, an R value (at 5% $CO_2$) of 3.2 and an α value of 0.63±0.02 ($R^2$=0.9938) where R=($Abs_0$–Abs)/(Abs–Abs∞)=α % $CO_2$. Thus $CO_2$(S=1/2)=1.59. See FIG. 9, $3^{rd}$ entry.

Figure 6F:
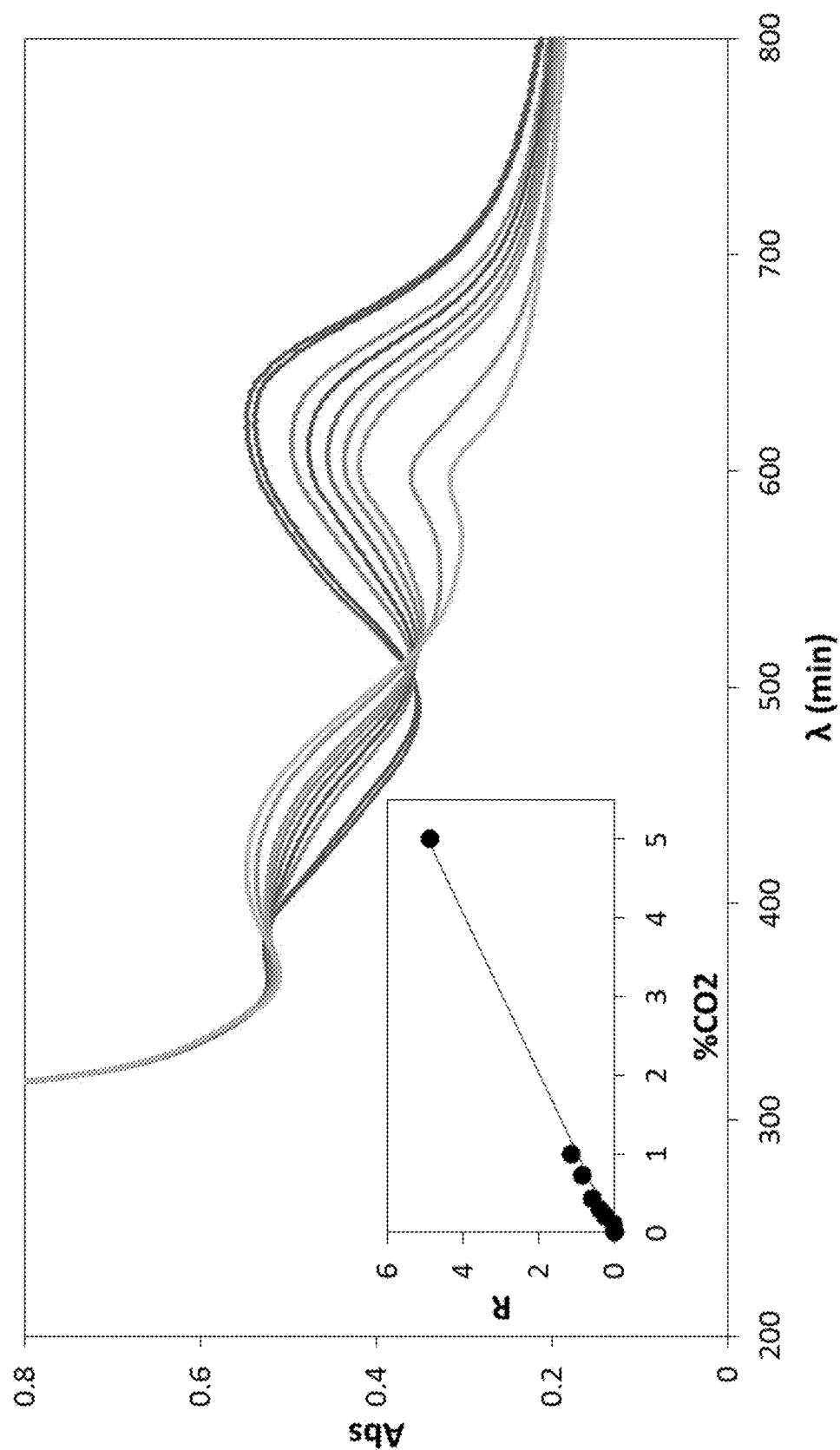

FIG. 6F shows the spectra of the film of Example 6 (MCP-PP-LDPE) when exposed to the following different percentages of $CO_2$ (from top to bottom at 601 nm): 0, 0.1, 0.21, 0.29, 0.43, 0.73, 1, 5 and 100%. This data reveals via the insert plot for data at 601 nm, a R value (at 5% $CO_2$) of 4.9 and an α value of 0.97±0.02 (R2=0.9938) where R=($Abs_0$–Abs)/(Abs–Abs∞)=α % $CO_2$. Thus $CO_2$(S=1/2)=1.03. See FIG. 9, $4^{th}$ entry.

As before, the response and recovery profile of the plastic films were tested by purging alternative streams of $CO_2$ and air. For Example 4, see FIG. 8D, from which the 50% response time ($t_{50\downarrow}$)=0.1 min and 50% recovery time ($t_{50\uparrow}$)= 2.9 min can be calculated. For Example 5, see FIG. 8E, from which the 50% response time (t50↓)=0.2 min and 50% recovery time (t50_)=8.6 min can be calculated. Finally, for Example 6, see FIG. 8F from which the 50% response time (t50↓)=0.2 min and 50% recovery time (t50↑)=2.3 min can be calculated.

For the following examples, ammonia is used as the detected chemical substance instead of $CO_2$. In the case of the ammonia indicators, the response times were all <0.1 min, and so only the 50% recovery times were measured.

Example 7

Figure 10A:
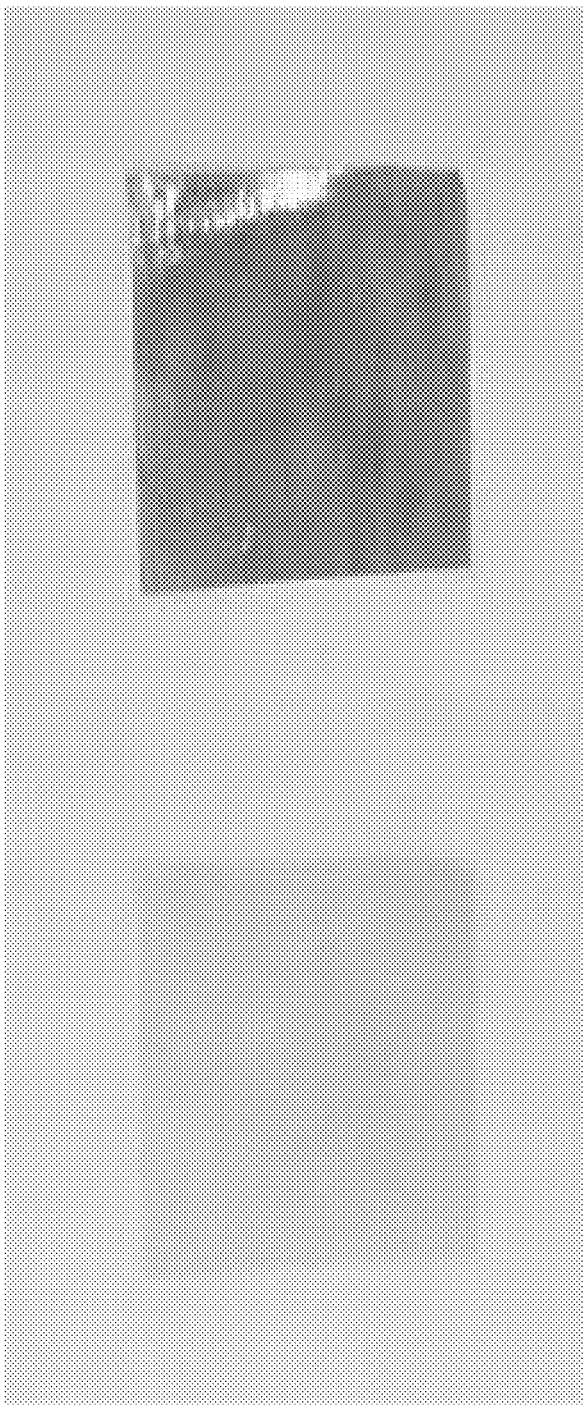
FIGS. 10A-C show photographs of an ammonia-sensitive film, in the absence (left hand side image) and presence (right-hand side image) of ammonia.

As in the CO2 sensing films, ammonia sensing films also show a color change response. As before, the response to the detected chemical substance is shown by color before and after exposure. In this example, the color change effect for a 10% pigmented BPB-LDPE-LDPE film before and after exposing to ammonia was measured and is seen in FIG. 10A. In this example, both the core polymer and the bulk polymer are LDPE. Thickness for this film was measured at 60 μm.

Changes in color can also be shown via UV/Visible absorption spectrophotometry. Measurements of the spectra of the dye in the deprotonated (D–) and protonated (HD) form were measured. Recovery spectra were measured, illustrating the change in absorbance of BPB-LDPE-LDPE plastic film after exposing to ammonia for 1 min and being left to recover in the air. See FIG. 11A. Values for λmax (nm) are 432 (D–) and 620 (HD), see FIGS. 11A and 13.

Figure 12A:
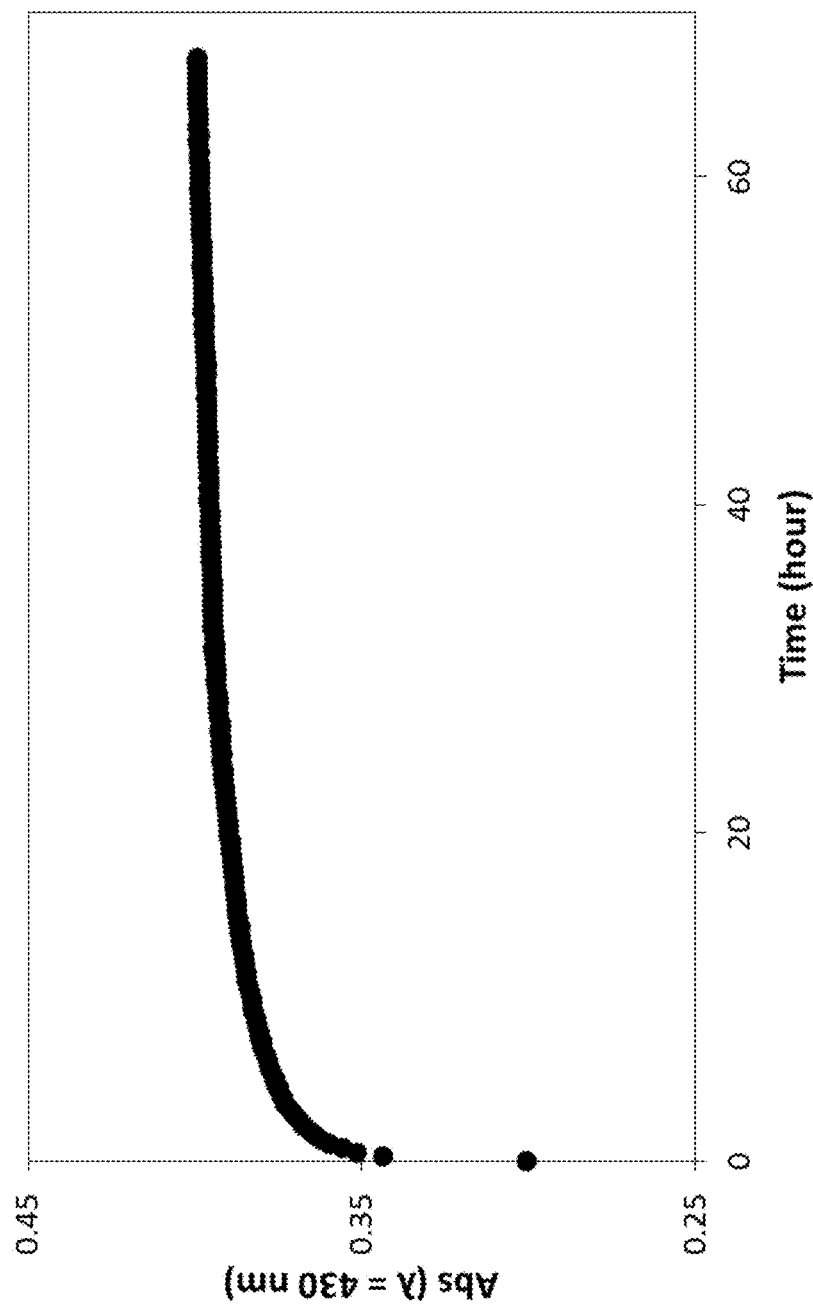
FIGS. 12A-C show absorbance vs time profiles recorded for plastic films upon exposure to alternative streams of ammonia and air.

As in previous examples, the response and recovery to a change in the detected chemical substance level was measured. In the case of ammonia indicators, the response times were all <0.1 min, and so only the 50% recovery times were measured. In this example, a 10% BPB-LDPE-LDPE plastic film was exposed to ammonia for 1 min, then allowed to recover. See FIG. 12A. From the curve it is shown that a 90% recovery time (t50) of 25 hour can be calculated.

Example 8

Figure 10B:
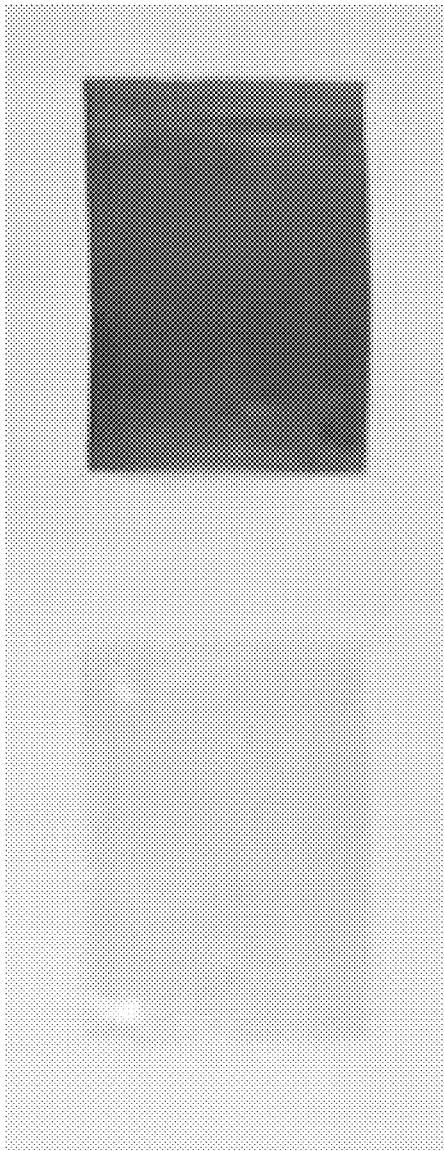

Color change response to the detected chemical substance is measured as above. In this example, the color change effect for a 10% pigmented BCG-LDPE-LDPE film before and after exposing to ammonia was measured and is seen in FIG. 10B. In this example, both the core polymer and the bulk polymer are LDPE. Thickness for this film was measured at 68 μm.

Recovery spectra were measured, illustrating the change in absorbance of BCG-LDPE-LDPE plastic film after exposing to ammonia for 1 min and being left to recover in the air. See FIG. 11B. Values for λmax (nm) are 420 (D−) and 619 (HD), see FIGS. 11B and 13.

Figure 12B:
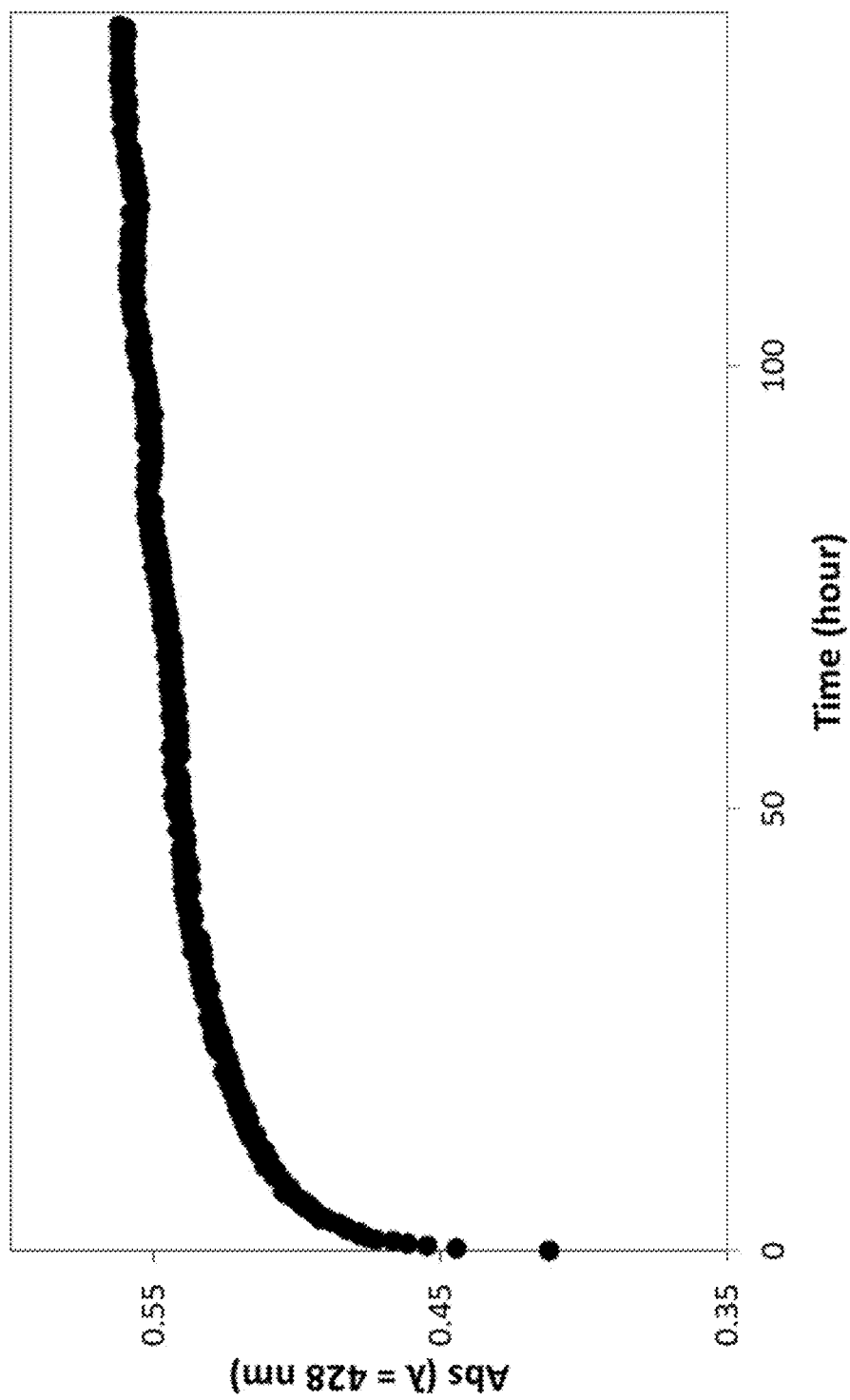

The response and recovery to a change in the detected chemical substance level was measured. In this example, a 10% BCG-LDPE-LDPE plastic film was exposed to ammonia for 1 min, and then allowed to recover. See FIG. 12B. From the curve it is shown that a 90% recovery time (t50) of 84 hour can be calculated.

Example 9

Figure 10C:
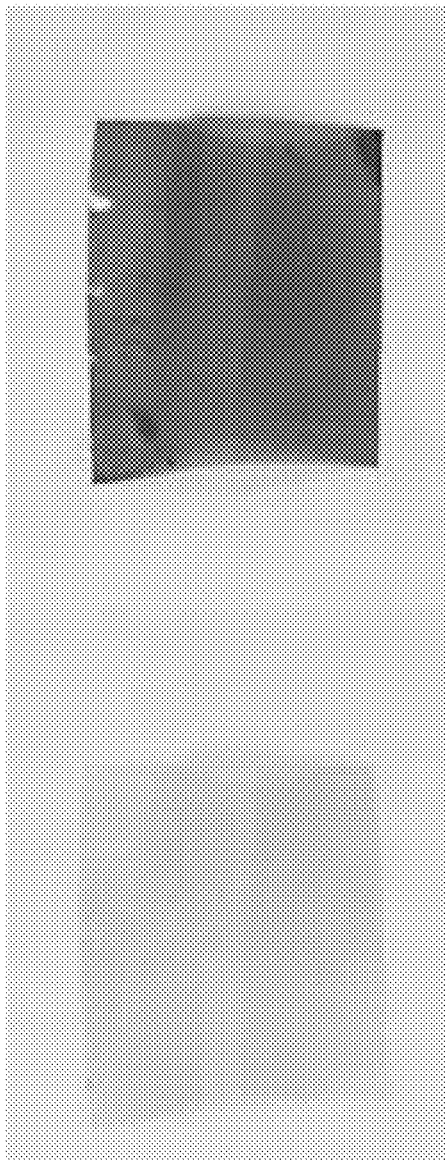
Figure 11A:
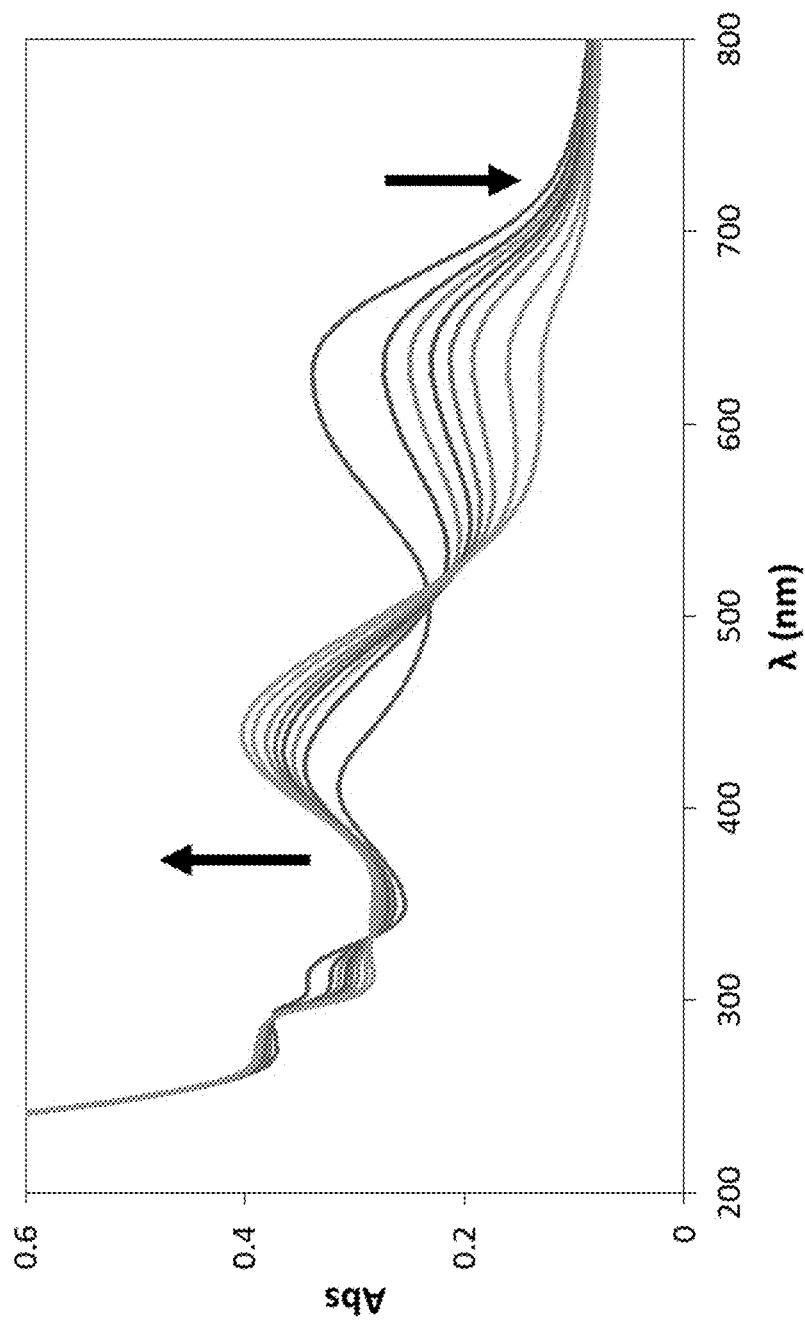
FIGS. 11A-C show recovery spectra of plastic films after exposure to ammonia and recovery in the air.
Figure 11B:
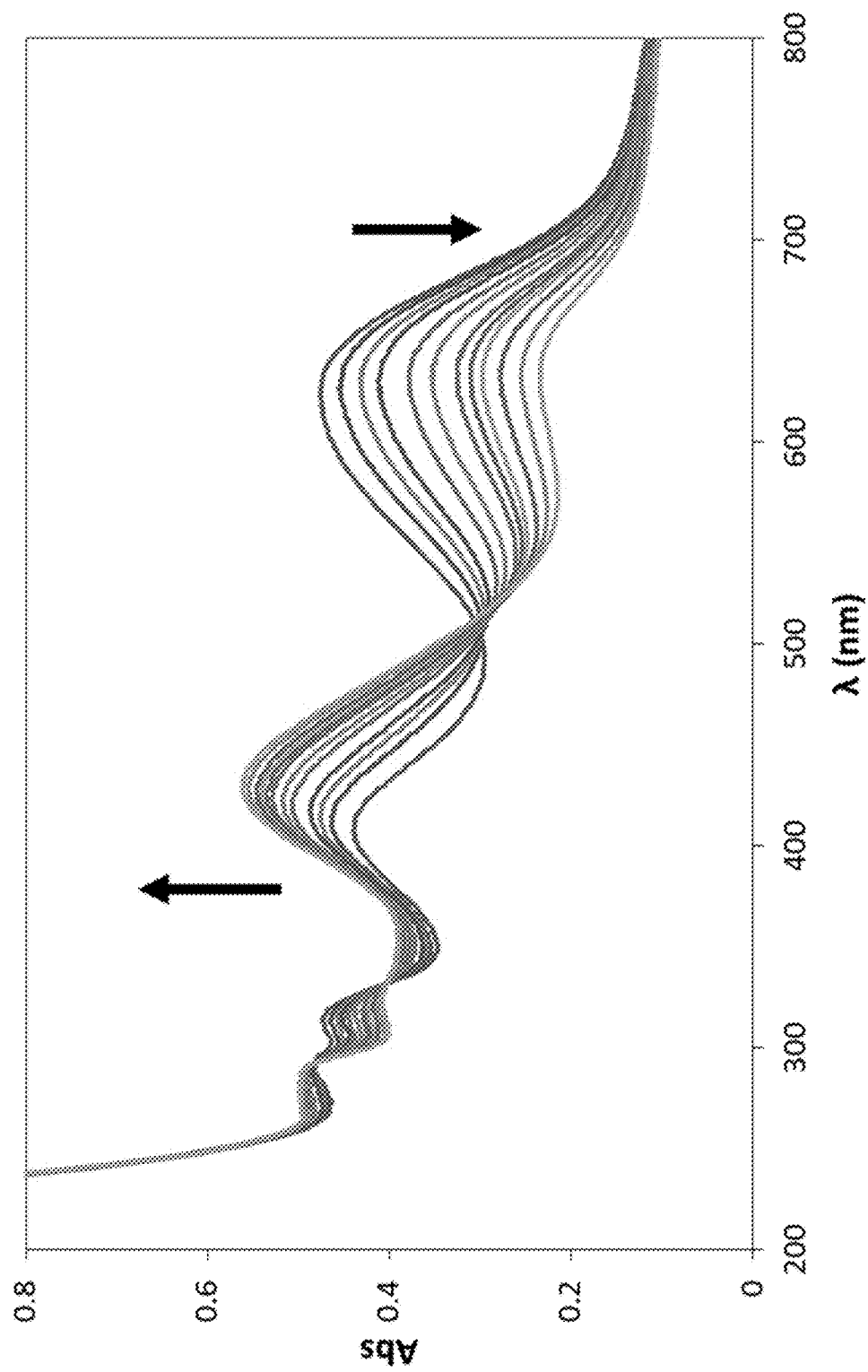
Figure 11C:
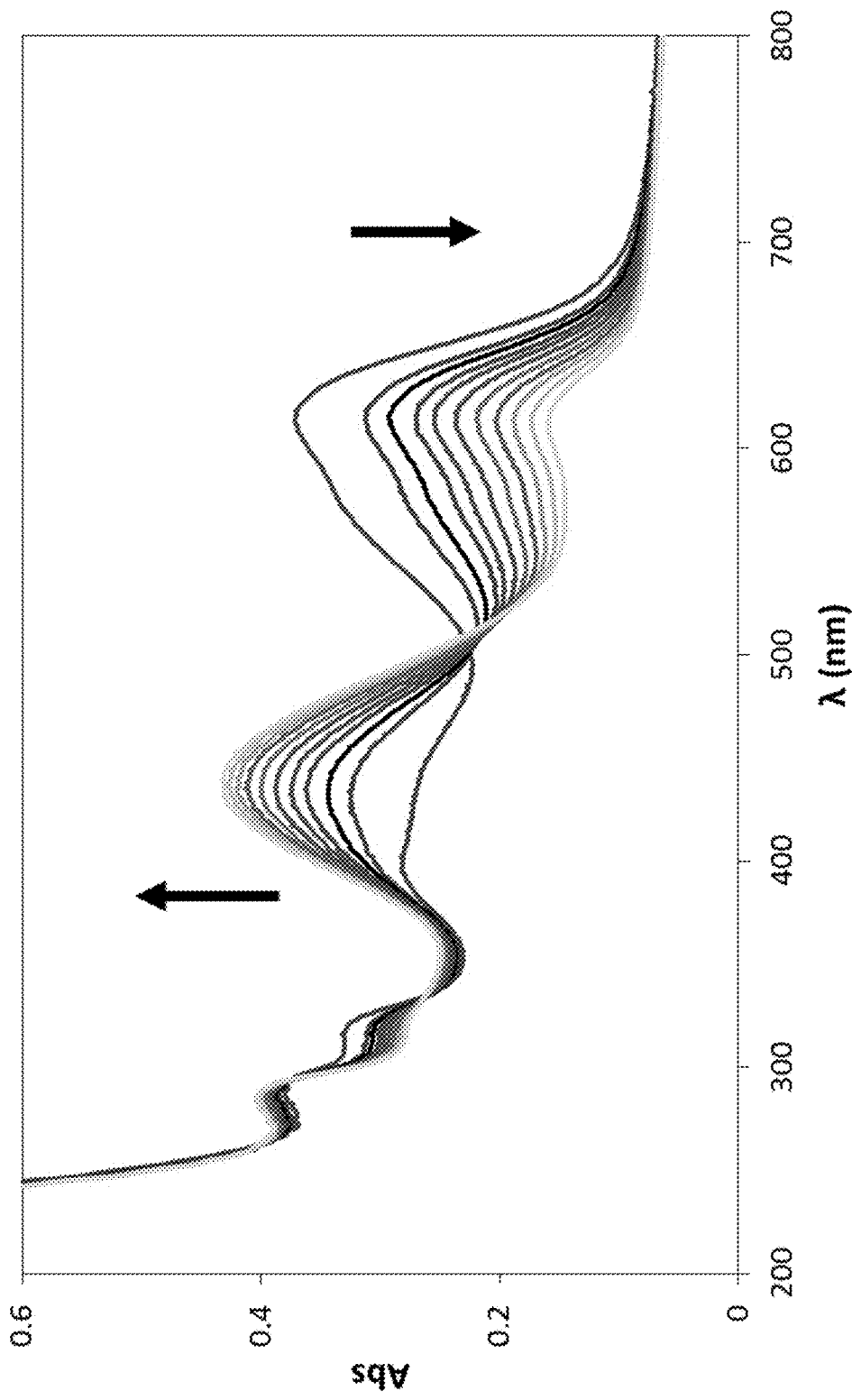

Color change response to the detected chemical substance is measured as above. In this example, the color change effect for a 10% pigmented BPB-PP-LDPE film before and after exposing to ammonia was measured and is seen in FIG. 10C. In this example, the core polymer is polypropylene (PP) and the bulk polymer is LDPE. Thickness for this film was measured at 65 μm.

Recovery spectra were measured, illustrating the change in absorbance of BPB-PP-LDPE plastic film after exposing to ammonia for 1 min and being left to recover in the air. See FIG. 11C. Values for λmax (nm) are 432 (D−) and 620 (HD), see FIGS. 11C and 14.

Figure 12C:
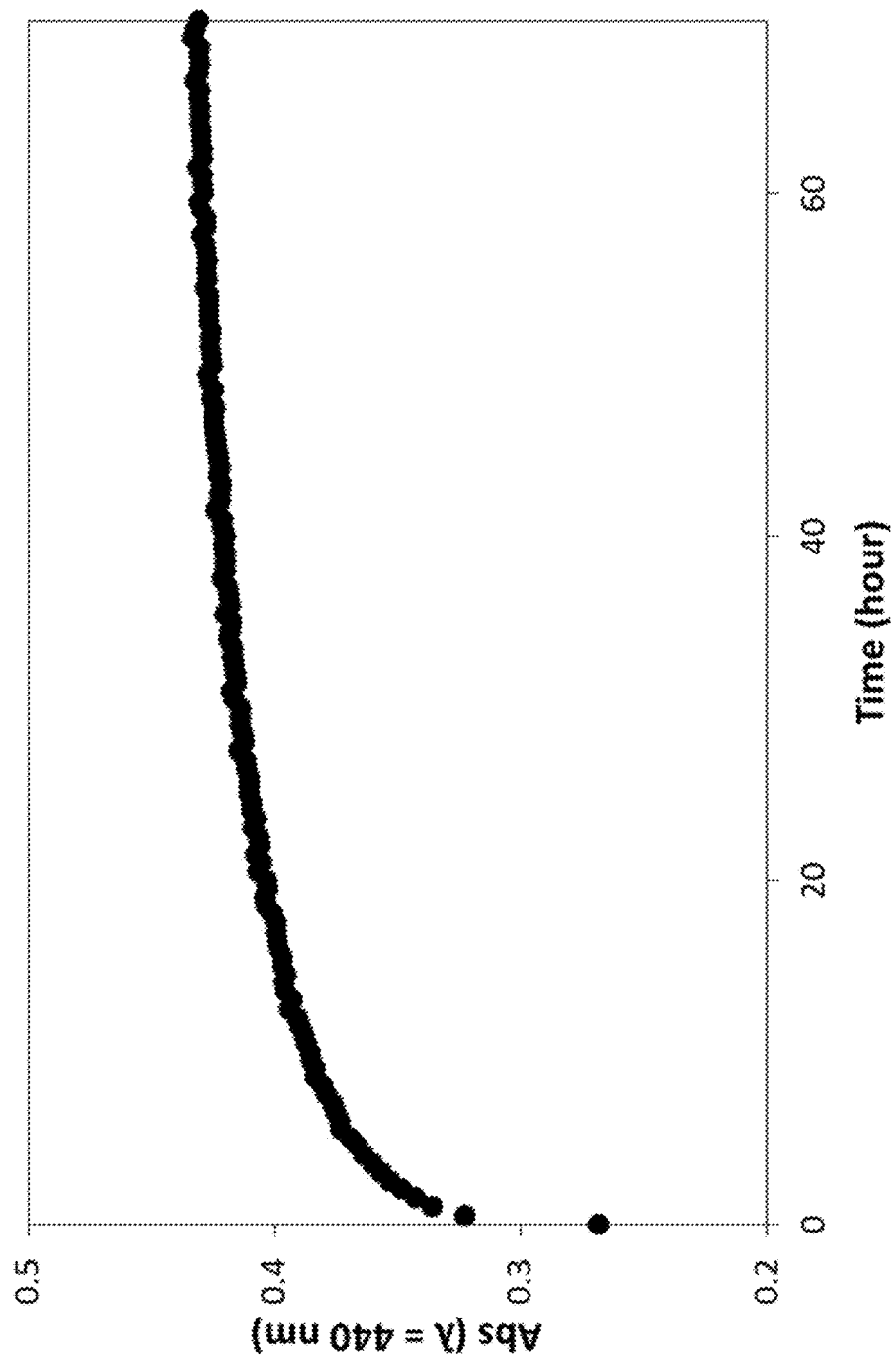

The response and recovery to a change in the detected chemical substance level was measured. In this example, a 10% BPB-PP-LDPE plastic film was exposed to ammonia for 1 min, and then allowed to recover. See FIG. 12C. From the curve it is shown that a 90% recovery time (t50) of 36 hour can be calculated.

A comparison between the values for the films of Example 7 (BPB-LDPE-LDPE) and Example 9 (BPB-PP-LDPE) is shown in FIG. 14. This shows the difference between films utilizing the same dye and bulk polymer, but having a different core polymer.

While the application has been described with reference to certain embodiments, it will be understood by those skilled in the art that various changes may be made and equivalents may be substituted without departing from the scope of the application. In addition, many modifications may be made to adapt a particular situation or material to the teachings of the application without departing from its scope. Therefore, it is intended that the application not be limited to the particular embodiment disclosed, but that the application will include all embodiments falling within the scope of the appended claims.

The invention claimed is:

1. A color changeable organic polymeric composite comprising:
   bulk organic polymer;
   organic polymer core particles; and
   organic color changeable indicator dye that detects the presence of a chemical substance, wherein the organic color changeable indicator dye is coated on the organic polymer core particles to form organic indicator particles, wherein the organic indicator particles have an average particle size between 10 and 1000 microns, wherein the bulk organic polymer is extruded or melted with the organic indicator particles to produce the color changeable organic polymer composite, wherein the organic color changeable indicator dye is substantially homogeneously dispersed within and throughout the color changeable organic polymer composite, and wherein the color changeable organic polymer composite substantially lacks inorganic particulates, and wherein the color changeable organic polymeric composite is in the form of a film having a thickness of approximately 10 microns to approximately 250 microns.

2. The color changeable organic polymeric composite of claim 1 wherein the color changeable organic polymeric composite is substantially free of aggregation of the organic color changeable indicator dye.

3. The color changeable organic polymeric composite of claim 1 wherein the at least one bulk organic polymer and the at least one core organic polymer are selected from the group consisting of low density polyethylene (LDPE), polystyrene (PS), polymethylmethacrylate (PMMA), polypropylene (PP), polycaprolactone (PCL), and mixtures thereof.

4. The color changeable organic polymeric composite of claim 1 wherein the at least one organic color changeable indicator dye is a carbon dioxide-based indicator dye.

5. The color changeable organic polymeric composite of claim 1 wherein the at least one organic color changeable indicator dye is an ammonia-based indicator dye.

6. The color changeable organic polymeric composite of claim 1 wherein the at least one organic color changeable indicator dye is selected from the group consisting of: metacresol purple (MCP), thymol blue (TB), phenol red (PR), cresol red (CR), bromocresol green (BCG), bromophenol blue (BPB), chlorophenol red (CPR), methylene blue (MB), and mixtures thereof.

7. The color changeable organic polymeric composite of claim 1 wherein the at least one bulk organic polymer is LDPE and the organic color changeable indicator dye is selected from metacresol purple (MCP), thymol blue (TB) and phenol red (PR).

8. The color changeable organic polymeric composite of claim 1 wherein the color changeable organic polymeric composite is incorporated into or disposed on a ring.

* * * * *

UNITED STATES PATENT AND TRADEMARK OFFICE
CERTIFICATE OF CORRECTION

Page 1 of 1

PATENT NO. : 12,306,154 B2
APPLICATION NO. : 15/832379
DATED : May 20, 2025
INVENTOR(S) : Gregory L. Heacock et al.

It is certified that error appears in the above-identified patent and that said Letters Patent is hereby corrected as shown below:

In the Specification

1. In Column 17, Line 47, delete "$R=(Abs_0–Abs)/(Abs–Abs_4)=[HD]/[D^-]$" and insert -- $R=(Abs_0–Abs)/(Abs–Abs_\infty)=[HD]/[D^-]$ --, therefor.

2. In Column 19, Line 4, delete "$R=(Abs_0–Abs)/(Abs–Abs_{oc})=\alpha \% CO_2.$" and insert -- $R=(Abs_0–Abs)/(Abs–Abs_\infty)=\alpha \% CO_2.$ --, therefor.

3. In Column 19, Line 9, delete "$(t_{50} \downarrow)=0.2$" and insert -- $(t_{50}\downarrow)=0.2$ --, therefor.

4. In Column 19, Line 36, delete "$(t_{50\_})=1.5$" and insert -- $(t_{50}\downarrow)=1.5$ --, therefor.

5. In Column 19, Line 62, delete "a" and insert -- $\alpha$ --, therefor.

6. In Column 20, Line 26, delete "$(t50\_)=8.6$" and insert -- $(t_{50}\downarrow)=8.6$ --, therefor.

Signed and Sealed this
Eighth Day of July, 2025

Coke Morgan Stewart
*Acting Director of the United States Patent and Trademark Office*